United States Patent
Lee et al.

(10) Patent No.: US 12,481,395 B2
(45) Date of Patent: Nov. 25, 2025

(54) ELECTRONIC DEVICE AND CONTROL METHOD THEREFOR

(71) Applicant: Samsung Electronics Co., Ltd., Suwon-si (KR)

(72) Inventors: Jookwan Lee, Suwon-si (KR); Yongjin Kwon, Suwon-si (KR); Yangwook Kim, Suwon-si (KR); Jihea Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/615,826

(22) Filed: Mar. 25, 2024

(65) Prior Publication Data

US 2024/0231537 A1    Jul. 11, 2024

Related U.S. Application Data

(63) Continuation of application No. PCT/KR2022/014026, filed on Sep. 20, 2022.

(30) Foreign Application Priority Data

Oct. 28, 2021 (KR) .................. 10-2021-0145115
Jan. 13, 2022 (KR) .................. 10-2022-0005296

(51) Int. Cl.
*G06F 3/041*    (2006.01)

(52) U.S. Cl.
CPC ...... *G06F 3/041661* (2019.05); *G06F 3/0418* (2013.01); *G06F 2203/04102* (2013.01)

(58) Field of Classification Search
None
See application file for complete search history.

(56) References Cited

U.S. PATENT DOCUMENTS 9,898,131 B2    2/2018  Shiozaki
10,963,016 B1 *  3/2021  Oh .................. G06F 3/0416
(Continued)

FOREIGN PATENT DOCUMENTS

JP    2017016421 A    1/2017
KR    20100052227 A    5/2010
(Continued)

OTHER PUBLICATIONS

International Search Report for PCT/KR2022/014026 mailed Dec. 21, 2022, 4 pages.
(Continued)

*Primary Examiner* — Mihir K Rayan
(74) *Attorney, Agent, or Firm* — NIXON & VANDERHYE P.C.

(57) ABSTRACT

According to an embodiment, a method of controlling an electronic device including a touch screen panel (TSP) at least a part of which is located in a housing may be withdrawn to the outside of the housing comprises: identifying a withdrawal extent of the TSP; selecting a reference line for controlling a power supplying range of a plurality of touch areas among a plurality of lines for dividing a plurality of touch areas of the TSP based on the withdrawal degree; supplying power to touch areas in a first direction in which the TSP is withdrawn based on the reference line and blocking power to touch areas in a second direction opposite to the first direction based on the reference line, among the plurality of touch areas; and restricting touch recognition with respect to a part extending from the reference line in one touch area adjacent to the reference line among the touch areas in the first direction.

13 Claims, 22 Drawing Sheets

(56) References Cited

U.S. PATENT DOCUMENTS

| | | | |
|---|---|---|---|
| 2013/0234951 A1 | 9/2013 | Kim | |
| 2014/0292672 A1* | 10/2014 | Choi | G06F 3/041 |
| | | | 345/173 |
| 2017/0090659 A1 | 3/2017 | Shiozaki | |
| 2017/0168638 A1 | 6/2017 | Shi | |
| 2018/0081473 A1* | 3/2018 | Seo | G06F 3/044 |
| 2018/0275770 A1* | 9/2018 | Kang | G06F 3/0488 |
| 2020/0225848 A1* | 7/2020 | Yoon | G06F 3/0481 |
| 2022/0087040 A1* | 3/2022 | Song | G06F 1/1681 |
| 2023/0016622 A1* | 1/2023 | Gudivada | G06F 1/1624 |
| 2023/0109078 A1* | 4/2023 | Li | G06F 1/1624 |
| | | | 345/173 |

FOREIGN PATENT DOCUMENTS

| | | | |
|---|---|---|---|
| KR | 20110120915 A | 11/2011 | |
| KR | 101670107 A | 11/2016 | |
| KR | 20170081347 A | 7/2017 | |
| KR | 20180031886 A | 3/2018 | |
| KR | 20180090635 A | 8/2018 | |
| WO | 2021015330 A1 | 1/2021 | |

OTHER PUBLICATIONS

Written Opinion of the ISA for PCT/KR2022/014026 mailed Dec. 21, 2022, 5 pages.

\* cited by examiner

ELECTRONIC DEVICE AND CONTROL METHOD THEREFOR

CROSS-REFERENCE TO RELATED APPLICATIONS

This application is a continuation of International Application No. PCT/KR2022/014026 designating the United States, filed on Sep. 20, 2022, in the Korean Intellectual Property Receiving Office and claiming priority to Korean Patent Application Nos. 10-2021-0145115, filed on Oct. 28, 2021, and 10-2022-0005296, filed on Jan. 13, 2022, in the Korean Intellectual Property Office, the disclosures of each of which are incorporated by reference herein in their entireties.

BACKGROUND

Field

The disclosure relates to a rollable electronic device and a control method thereof.

Description of Related Art

Electronic devices are being transformed from a uniform rectangular shape into a variety of shapes. Research on electronic devices has been conducted to implement a deformable structure that is easy to carry and enables the use of a large-screen display.

In a rollable device, a partial area of a display may be disposed in a housing, a partial area of the display may be withdrawn from or may be inserted into the housing as one housing moves relative to the other housing, and a screen display area of the display visible to the outside of the housing may expand or may be reduced.

A wiring (or electrode) line or a line of a touch screen panel (TSP) may be fundamentally a driving line supplied with power or a transmitter (Tx) electrode of a plurality of wirings (or electrodes) included in the TSP and may be a sensing line or a receiver (Rx) line depending on the implementation of the TSP.

The description provided above shall not be construed that the applicant acknowledging as prior art the description provided in the present disclosure and shall be understood only as a related art of the present disclosure.

In an electronic device of which a display that is viewable through a front surface is expandable by withdrawing the display of which at least a portion is inserted into a housing, the display may include a touch screen panel (TSP) to receive touch recognition through the display and the TSP may be inserted into or may be withdrawn from the housing together with the display. In this case, to reduce current consumption, the TSP may need to be controlled to enable touch recognition in a withdrawn area while touch recognition accurately corresponds to coordinates to be input.

To control the TSP, power supply may be controlled based on one line disposed in the housing among a plurality of wiring lines included in the TSP. For example, based on one line disposed in the housing, power may be supplied only to a line in an area exposed to the outside of the housing. An interval of coordinates or pixels of the display may be different from an interval of wiring lines of the TSP, and due to this, various algorithms have been implemented to match a position where a touch is sensed and display coordinates. However, due to the same reason, in the electronic device of which the display that is viewable through the front surface is expandable by withdrawing the display of which at least a portion is inserted into the housing, a TSP area including a boundary between the inside and outside of the housing may cause a touch error because of a curvature change or housing equipment. As a solution, when the boundary between the inside and outside of the housing is disposed between two wiring lines, if power supply is blocked to the two wiring lines, a touch input may be disabled in a partial area, and if power is supplied to all, an unnecessary touch may be caused in the housing. As another solution, the interval of wiring lines of the TSP may be manufactured to be the same as the interval of coordinates or pixels of the display and power may be supplied to all wiring lines, but the manufacturing cost and power consumption may increase.

SUMMARY

According to an example embodiment of the present disclosure, a method of controlling an electronic device including a touch screen panel (TSP), disposed in a housing, and at least a portion of which is configured to be withdrawn from the housing, the method comprising: identifying a withdrawal degree of the TSP; based on the withdrawal degree, selecting a reference line to control a power supply range of a plurality of touch areas of the TSP from a plurality of lines partitioning the plurality of touch areas, of the plurality of touch areas; supplying power to a touch area in a first direction in which the TSP is withdrawn based on the reference line and blocking power to a touch area in a second direction opposite to the first direction based on the reference line; and restricting touch recognition with respect to a portion extending from the reference line in a touch area in contact with the reference line in the touch area in the first direction.

According to an example embodiment of the present disclosure, an electronic device includes: a plurality of housings including a first housing and a second housing movable relative to the first housing, a touch screen panel (TSP) configured to be withdrawn from an outside of the plurality of housings based on the second housing moving, a memory configured to store executable instructions, and at least one processor, comprising processing circuitry, individually and/or collectively, configured to access the memory and execute the instructions, wherein at least one processor, individually and/or collectively is configured to: supply power to a touch area in a first direction in which the TSP is withdrawn based on the reference line to control a power supply range and block power to a touch area in a second direction opposite to the first direction based on the reference line; and restrict touch recognition in a portion extending from the reference line in a touch area in contact with the reference line in the touch area in the first direction.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
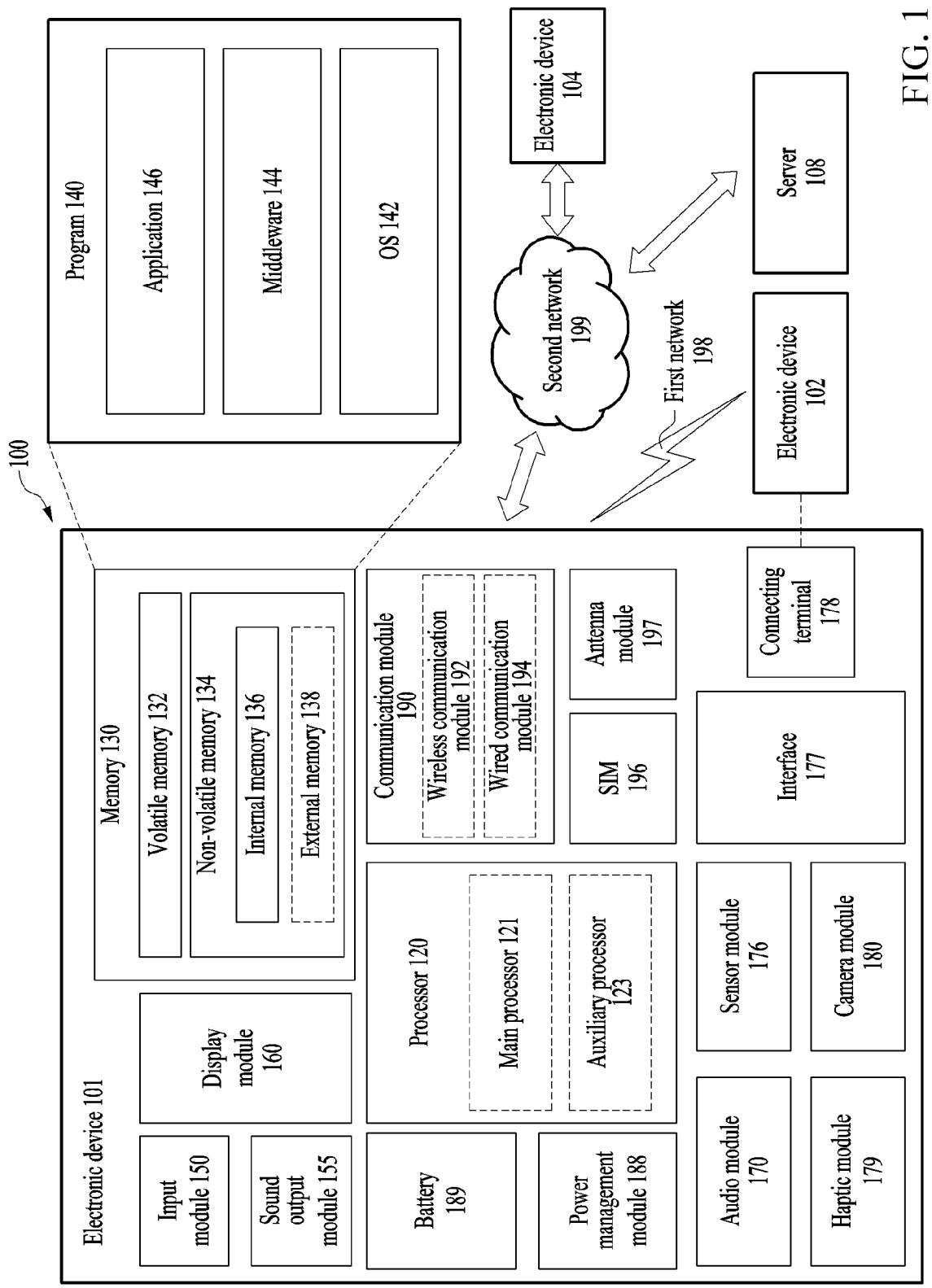
FIG. 1 is a block diagram illustrating an example electronic device in a network environment according to various embodiments.

Hereinafter, various example embodiments will be described in greater detail with reference to the accompanying drawings. When describing the embodiments with reference to the accompanying drawings, like reference numerals refer to like elements and a repeated description related thereto may not be repeated.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., by wire), wirelessly, or via a third element.

As used in connection with embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Embodiments of the present disclosure as set forth herein may be implemented as software (e.g., the program 120) including one or more instructions that are stored in a storage medium (e.g., an internal memory 136 or an external memory 138) that is readable by a machine (e.g., an electronic device). For example, a processor of the machine (e.g., an electronic device) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an example electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added in the electronic device 101. In various embodiments, some (e.g., the sensor module 176, the camera module 180, or the antenna module 197) of the components may be integrated as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2A:
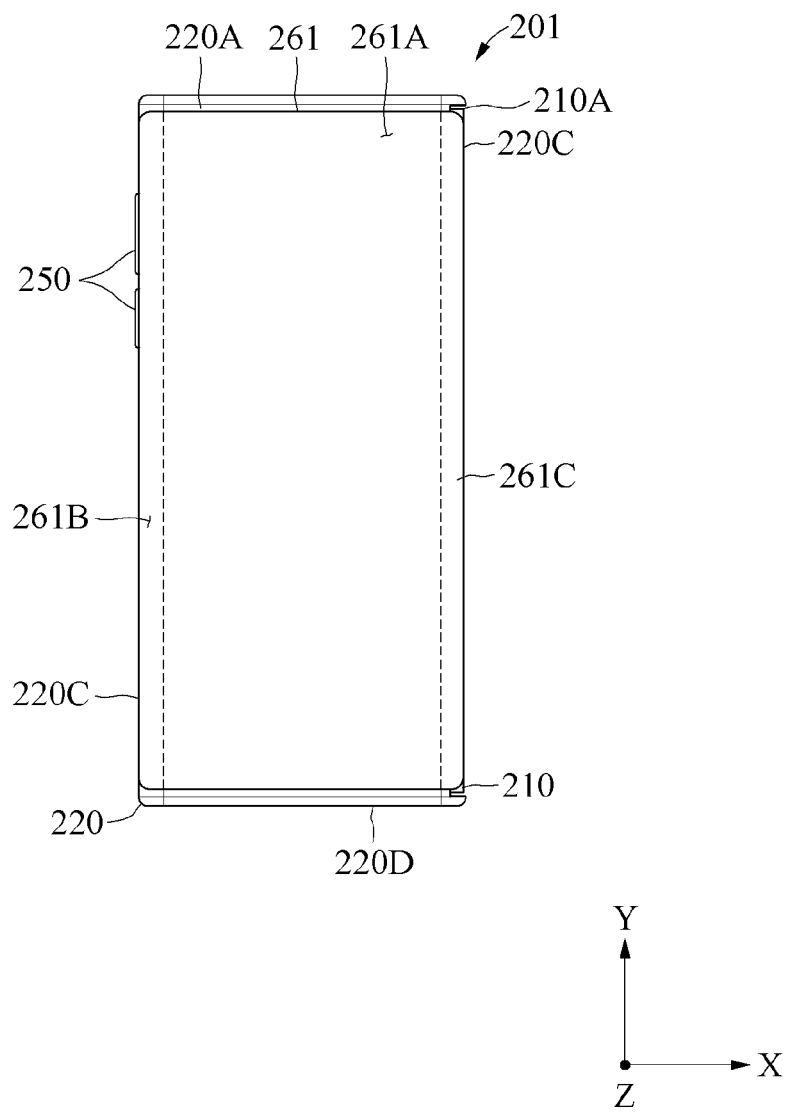
FIG. 2A is a diagram illustrating front view of an electronic device according to various embodiments.
Figure 2B:
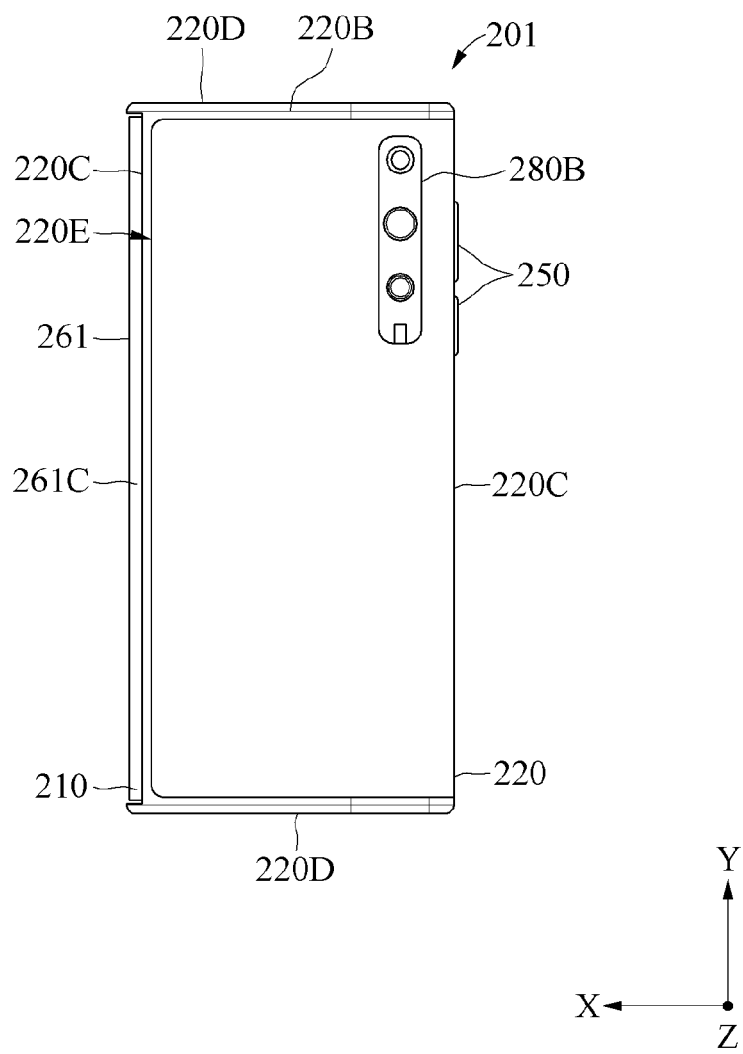
FIG. 2B is a diagram illustrating a rear view of the electronic device according to various embodiments.
Figure 2C:
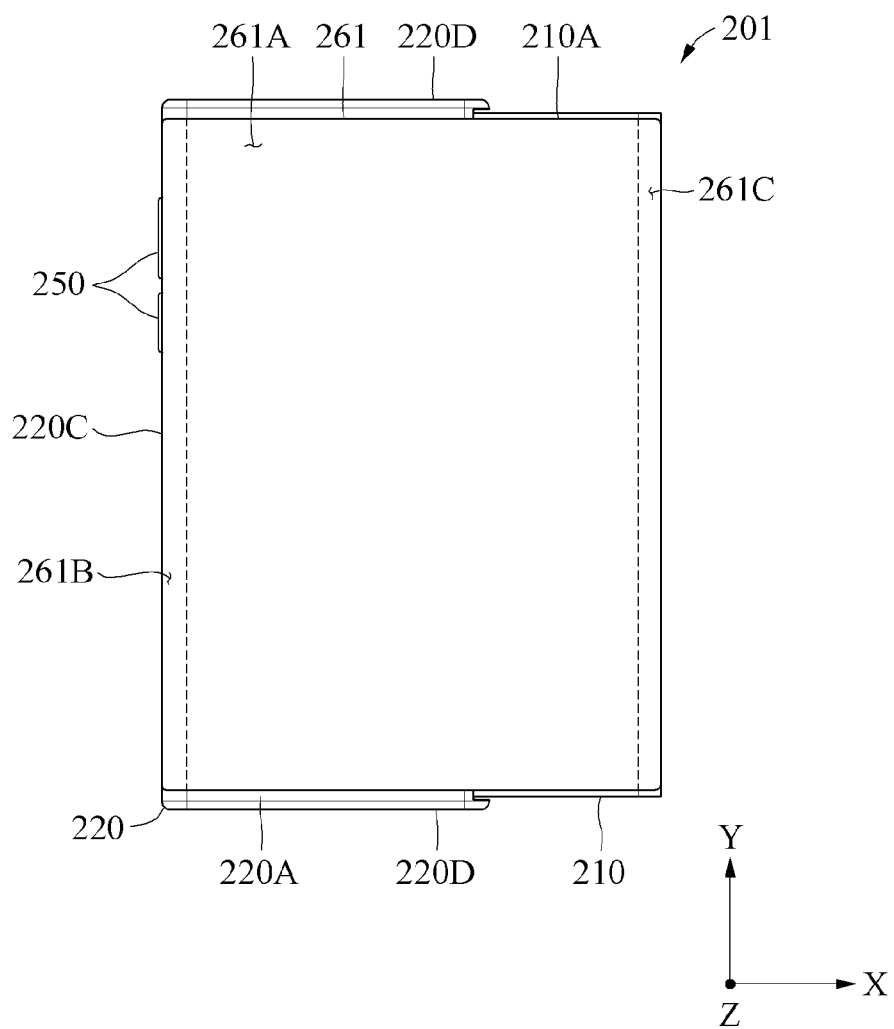
FIG. 2C is a diagram illustrating a front view of the electronic device according to various embodiments.
Figure 2D:
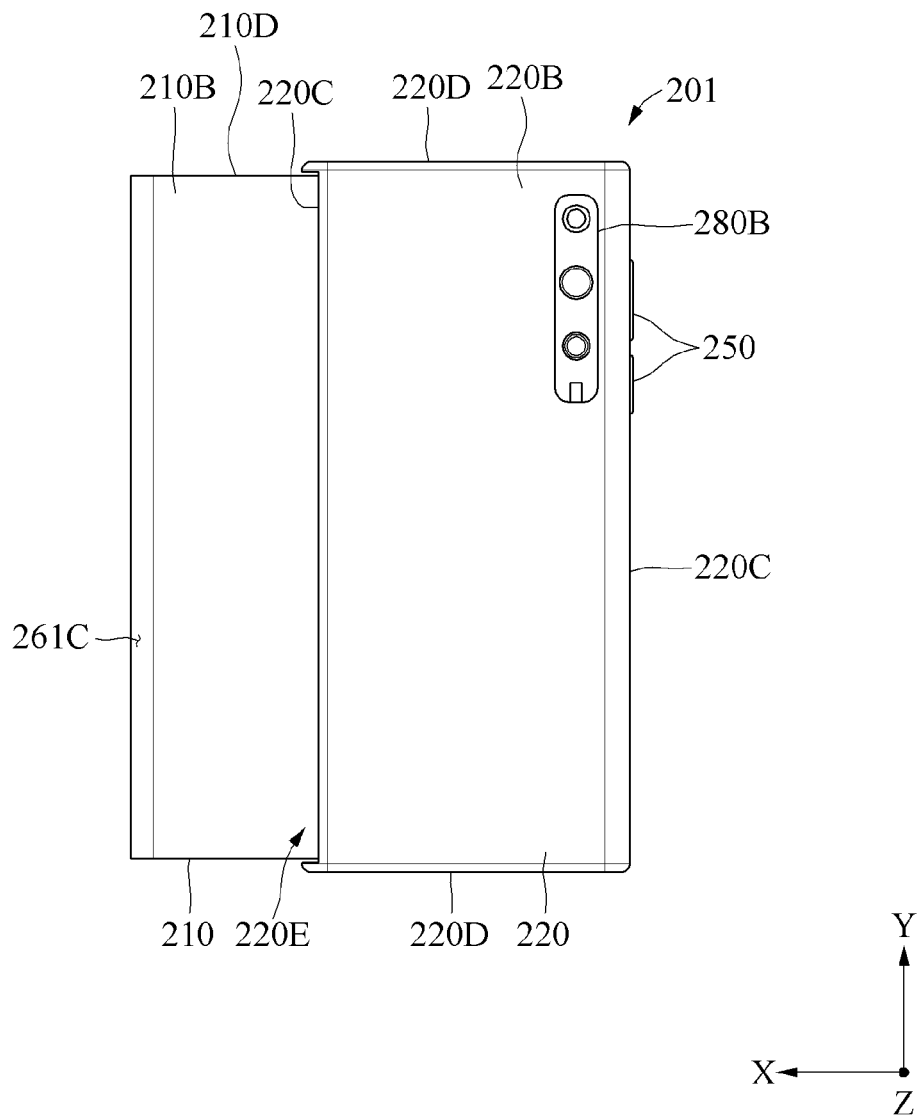
FIG. 2D is a diagram illustrating a rear view of the electronic device according to various embodiments.
Figure 2E:
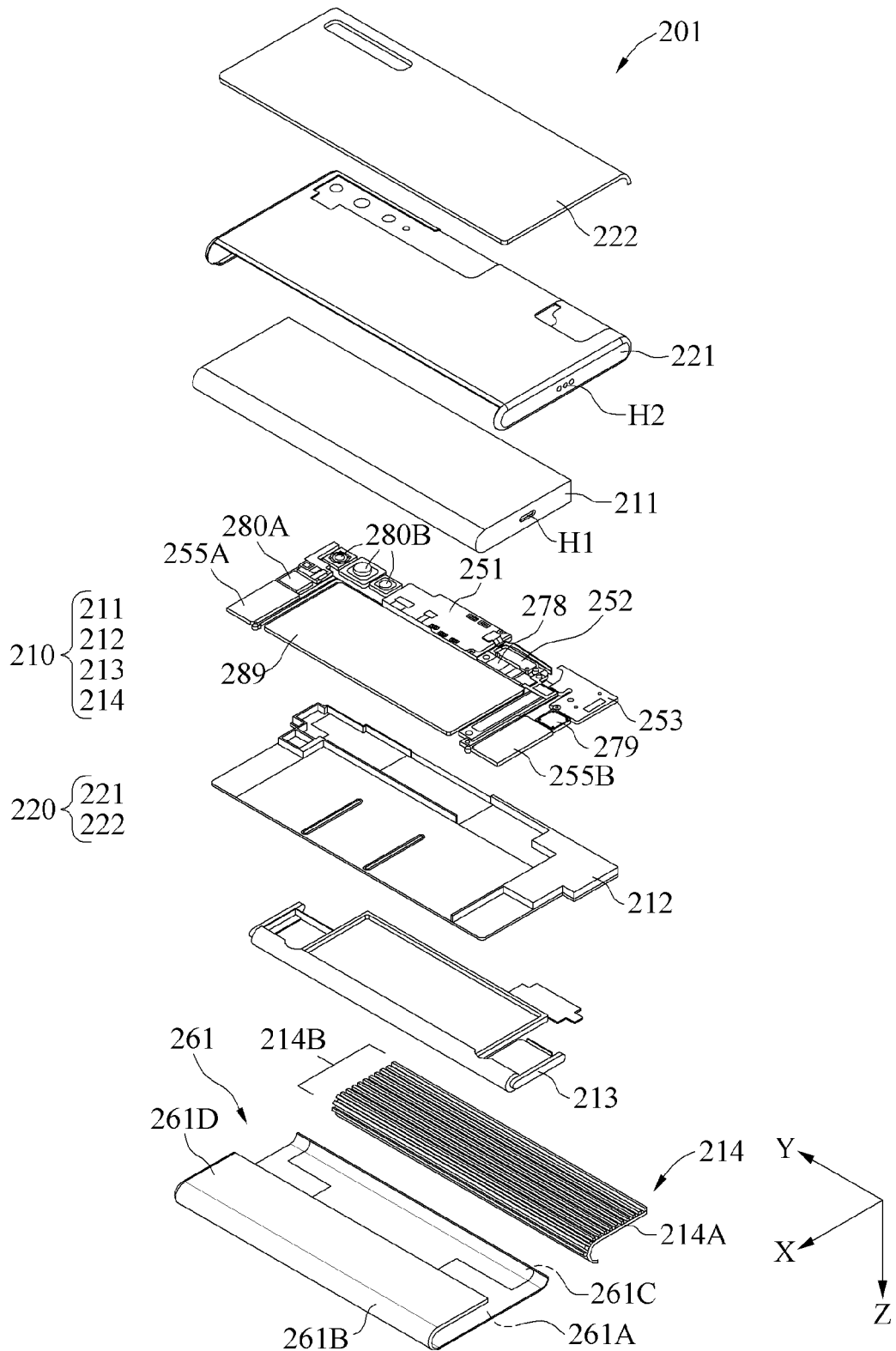
FIG. 2E is an exploded perspective view of the electronic device according to various embodiments.

FIG. 2A is a diagram illustrating a front view of an electronic device according to various embodiments, FIG. 2B is a diagram illustrating a rear view of the electronic device according to various embodiments, FIG. 2C is a diagram illustrating a front view of the electronic device according to various embodiments, FIG. 2D is a diagram illustrating a rear view of the electronic device according to various embodiments, and FIG. 2E is an exploded perspective view of the electronic device according to various embodiments.

FIGS. 2A and 2B are views illustrating the electronic device in a reduced state and FIGS. 2C and 2D are views illustrating the electronic device in an expanded state.

Referring to FIGS. 2A, 2B, 2C, 2D and 2E (which may be referred to as FIGS. 2A to 2E), an electronic device 201 (e.g., the electronic device 101 of FIG. 1) in an embodiment may include a first housing 210 and a second housing 220 forming an exterior and accommodating a component therein, wherein the first housing 210 and the second housing 220 may be movably coupled to each other.

In an embodiment, the first housing 210 may slide relative to the second housing 220 and may be coupled to the second housing 210. The first housing 210 may be configured to move relative to the second housing 220 in an expansion direction (e.g., the +X direction) or move relative to the second housing 220 in a reduction direction (e.g., the −X direction) opposite to the expansion direction.

Meanwhile, an embodiment of the present disclosure describes that the first housing 210 moves relative to the second housing 220, but is not limited thereto, and it may also be construed that the second housing 220 slides relative to the first housing 210. For example, the second housing 220 may move relative to the first housing 210.

In an embodiment, the first housing 210 may include a first surface 210A (e.g., a first front surface), a second surface 210B (e.g., a first rear surface) opposite to the first surface 210A, a plurality (e.g., two) of first side surfaces 210C (e.g., a first left side surface and a first right side surface) oriented in a direction (e.g., the +/−X direction) and positioned between the first surface 210A and the second surface 210B, and a plurality (e.g., two) of second side surfaces 210D (e.g., a first upper side surface and a first lower side surface) oriented in another direction (e.g., the +/−Y direction) intersecting with the direction (e.g., the +/−X direction) and positioned between the first surface 210A and the second surface 210B. In an embodiment, the plurality of first side surfaces 210C may be formed of rounded surfaces. The first housing 210 may include at least one first hole H1 formed on the second side surface 210D (e.g., the first lower side surface) oriented in a direction (e.g., the −Y direction) among the second side surfaces 210D.

In an embodiment, the second housing 220 may include a third surface 220A (e.g., a second front surface), a fourth surface 220B (e.g., a second rear surface) opposite to the third surface 220A, a plurality (e.g., two) of third side surfaces 220C (e.g., a second left side surface and a second right side surface) oriented in a direction (e.g., the +/−X direction) and positioned between the third surface 220A and the fourth surface 220B, and a plurality (e.g., two) of fourth side surfaces 220D (e.g., a second upper side surface and a second lower side surface) oriented in another direction (e.g., the +/−Y direction) intersecting with the direction (e.g., the +/−X direction) and positioned between the third surface 220A and the fourth surface 220B. Among the plurality of third side surfaces 220C, a third side surface 220C oriented in one direction (e.g., the +X direction) may include an open portion 220E that is at least partially open.

The plurality of third side surfaces 220C may be formed of rounded surfaces. The second housing 220 may include at least one second hole H2 formed on the fourth side surface 220D (e.g., the second lower side surface) oriented in a direction (e.g., the −Y direction) among the plurality of fourth side surfaces 220D. The second hole H2 may be aligned, for example, with the first hole H1.

In an embodiment, the electronic device 201 may include a display 261 (e.g., the display module 160 of FIG. 1) including screen display areas 261A, 261B, 261C, and 261D. In an embodiment, the display 261 may be any of a flexible display, a foldable display, or a rollable display.

In an embodiment, the screen display areas 261A, 261B, 261C, and 261D may include a first area 261A on the first surface 210A and the third surface 220A, a second area 261B on the third side surface 220C oriented in a direction (e.g., the −X direction) among the third side surfaces 220C, a third area 261C on the third side surface 220C oriented in another direction (e.g., the +X direction) among the third side surfaces 220C and at least partially enclosing the open portion 220E, and a fourth area 261D on the second surface 210B and the fourth surface 220B.

In an embodiment, the second area 261B and the third area 261C of the display 261 may have flexibly curved round surfaces. The second area 261B may be partially on the first surface 210A and the third surface 220A. The third area 261C may be partially on the first surface 210A and the third surface 220A. The third area 261C may be partially on the second surface 210B and the fourth surface 220B.

In an embodiment, the display 261 may be configured to partially display a screen. For example, the display 261 may display the screen through the first area 261A positioned on the first surface 210A and the third surface 220A, and the second area 261B, the third area 261C, and/or the fourth area 261D may display the screen from points of view different from that of the first area 261A. In an embodiment, the screen display area of the display 261 may expand or may be reduced as the first housing 210 moves in the expansion direction and the reduction direction.

In an embodiment, when viewed from a direction (e.g., the −Z direction), the electronic device 201 may change in shape between a first shape (e.g., a reduced state, the shape of FIG. 2A) having the screen display area (e.g., the first area 261A, the second area 261B, and the third area 261C) of a first size and a second shape (e.g., an expanded state, the shape of FIG. 2B) having the screen display area (e.g., the first area 261A, the second area 261B, and the third area 261C) larger than the first size. For example, when the first housing 210 moves relative to the second housing 220 in the expansion direction (e.g., the +X direction) in the first shape, the screen display area of the electronic device 201 viewed from a direction (e.g., the −Z direction) may expand as the size of the first area 261A increases and the size of the fourth area 261D decreases. In the second shape, when the first housing 210 moves relative to the second housing 220 in the reduction direction (e.g., the −X direction) opposite to the expansion direction, the size of the first area 261A may decrease and the size of the fourth area 261D may increase. While the electronic device 201 changes in shape between the first shape and the second shape, the size of the second area 261B and the size of the third area 261C may be substantially constant.

In an embodiment, the electronic device 201 may include a slide device 278 configured to move the first housing 210 and the second housing 220 relative to each other. The slide device 278 may be connected to the first housing 210 and the second housing 220 and may slide one of the first housing 210 and the second housing 220 relative to the other housing 210 or 220. As the first housing 210 or the second housing 220 moves, the display may expand or may be reduced.

In an embodiment, the electronic device 201 may include an input module 250 (e.g., the input module 150 of FIG. 1). The input module 250 may be, for example, formed on the third side surface 220C (e.g., the second left side surface) where the open portion 220E is not formed, among the plurality of third side surfaces 220C.

In an embodiment, the electronic device 201 may include a first sound output module 255A (e.g., the sound output module 155 of FIG. 1) and a second sound output module 255B (e.g., the sound output module 155 of FIG. 1). The first sound output module 255A may be on a first portion (e.g., an upper portion) of the first housing 210 and the second sound output module 255B may be on a second portion (e.g., a lower portion) different from the first portion of the first housing 210.

For example, in the first shape (e.g., the reduced state of the electronic device 201 of FIG. 2A), the first sound output module 255A may be configured to function as a transmitter/receiver and the second module 255B may be configured to function as a speaker, whereas in the second shape (e.g., the expanded state of the electronic device 201 of FIG. 2B), the first sound output module 255A and the second sound output module 255B may be configured to function as a speaker. In the second shape, the first sound output module 255A and the second sound output module 255B may output stereo sound in cooperation with each other.

In an embodiment, in the first shape, the second sound output module 255B may be configured to emit sound through the first hole H1 and the second hole H2 substantially aligned with each other, and in the second shape, the second sound output module 255B may be configured to emit sound through the first hole H1. At least one of the first sound output module 255A and the second sound output module 255B may be in the second housing 220. The electronic device 201 may include only one of the first sound output module 255A and the second sound output module 255B, or may further include an additional sound output module in addition to the shown sound output modules.

In an embodiment, the electronic device 201 may include a haptic module 279 (e.g., the haptic module 179 of FIG. 1). The haptic module 279 may include, for example, a vibrator configured to generate vibrations. The haptic module 279 may be in the second housing 220. The haptic module 279 may be adjacent to the second sound output module 255B. The haptic module 279 may be in the first housing 210.

In an embodiment, the electronic device 201 may include a first camera module 280A (e.g., the camera module 180 of FIG. 1) and a second camera module 280B (e.g., the camera module 180 of FIG. 1). The first camera module 280A may be configured to obtain an image of one direction (e.g., the +Z direction) of the electronic device 201, and the second camera module 280B may be configured to obtain an image of the other direction (e.g., the −Z direction) of the electronic device 201.

In an embodiment, the first camera module 280A and the second camera module 280B may be in the second housing 220. At least one of the first camera module 280A and the second camera module 280B may be in the first housing 210. The electronic device 201 may include only one of the first camera module 280A and the second camera module 280B, or may further include an additional camera module in addition to the shown camera modules.

In an embodiment, the electronic device 201 may include a battery 289 (e.g., the battery 189 of FIG. 1). The battery 289 may be in the first housing 210. The battery 289 may be at least partially enclosed by, for example, the first sound output module 255A, the first camera module 280A, the second camera module 280B, a first PCB 251, the slide device 278, a third PCB 253, the haptic module 279, and the second sound output module 255B. The battery 289 may be in the second housing 220.

In an embodiment, the electronic device 201 may include the first PCB 251, a second PCB 252, and the third PCB 253. The first PCB 251, the second PCB 252, and the third PCB 253 may include a plurality of metal layers and a plurality of dielectrics each positioned between a pair of adjacent metal layers. The first PCB 251 may be in the second housing 220. The first PCB 251 may include a first electronic component 288 (e.g., the power management module 188 of FIG. 1). The second PCB 252 may be in the first housing 210. For example, the second PCB 252 may be electrically connected to the slide device 278. The third PCB 253 may be in the second housing 220. For example, the third PCB 253 may be electrically connected to the haptic module 279.

The electronic device 201 in an embodiment may include the housings 210 and 220. Specifically, the electronic device 201 may include a first cover 211, a first plate 212, a second plate 213, and a support structure 214, and the first cover 211, the first plate 212, the second plate 213, and the support structure 214 may form the first housing 210. The electronic device 201 may include a second cover 221 and a third plate 222, and the second cover 221 and the third plate 222 may form the second housing 220.

In an embodiment, the first cover 211 may partially enclose the first sound output module 255A, the first camera module 280A, the haptic module 279, and the second sound output module 255B. The first plate 212 may at least partially accommodate electronic components (e.g., the slide device 278, the first sound output module 255A, the second sound output module 255B, the first camera module 280A, the second camera module 280B, the first PCB 251, the second PCB 252, the third PCB 253, a connector assembly 290, the haptic module 279, and other electronic components). The second plate 213 may be positioned between the first plate 212 and the display 261 to support the slide device 278 and the display 261.

In an embodiment, the support structure 214 may include a base plate 214B configured to flexibly bend and a plurality of support bars 214B arranged along the base plate 214A to be spaced apart from each other and configured to support the display 261. The second cover 221 may be slidably coupled to the first cover 211 to at least partially enclose the first cover 211 and slide the first cover 211 relative to the second cover 221.

In an embodiment, the second cover 221 may be configured to guide the plurality of support bars 214B. The second cover 221 may expose at least a portion (e.g., the second camera module 280B) of the electronic component to the outside of the electronic device 201. The third plate 222 may enclose at least a portion of the second cover 221. The third plate 222 may be formed of, for example, a glass material. The structures of the first housing 210 and the second housing 220 described herein are not limited to the shown embodiments and may be various types of structures.

Figure 3A:
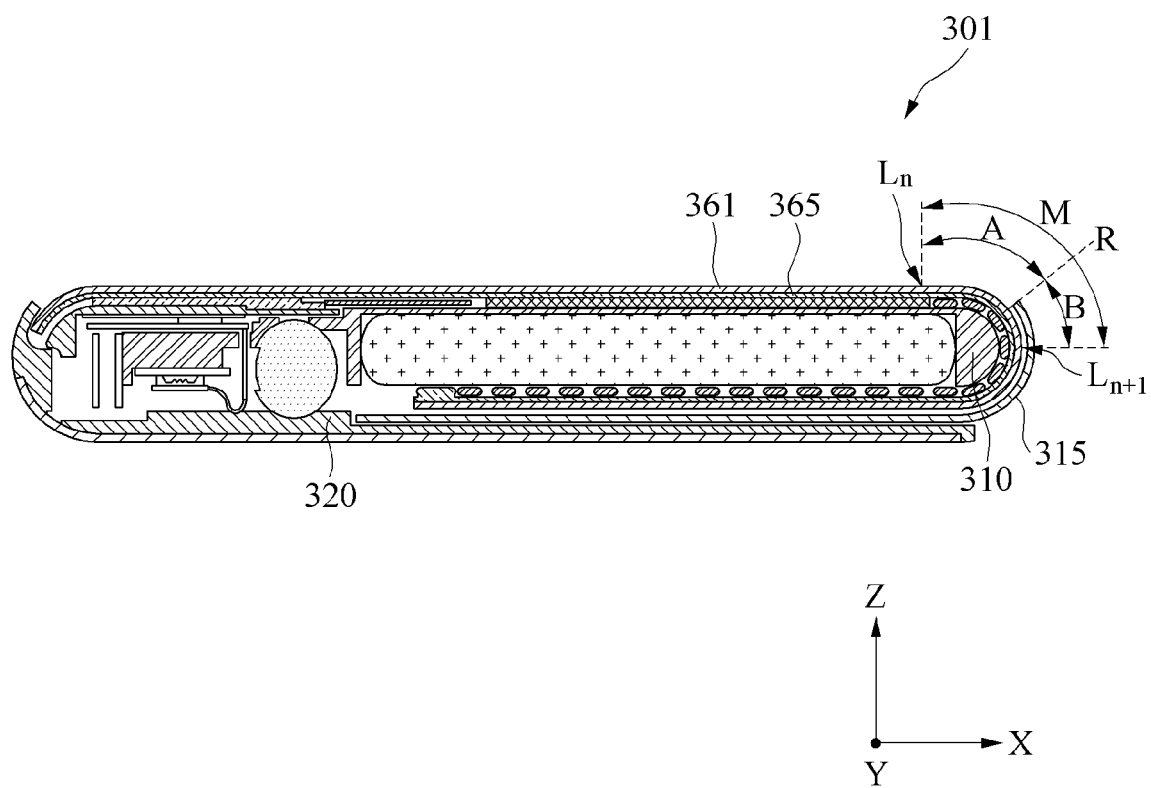
FIG. 3A is a cross-sectional view of an electronic device according to various embodiments.
Figure 3B:
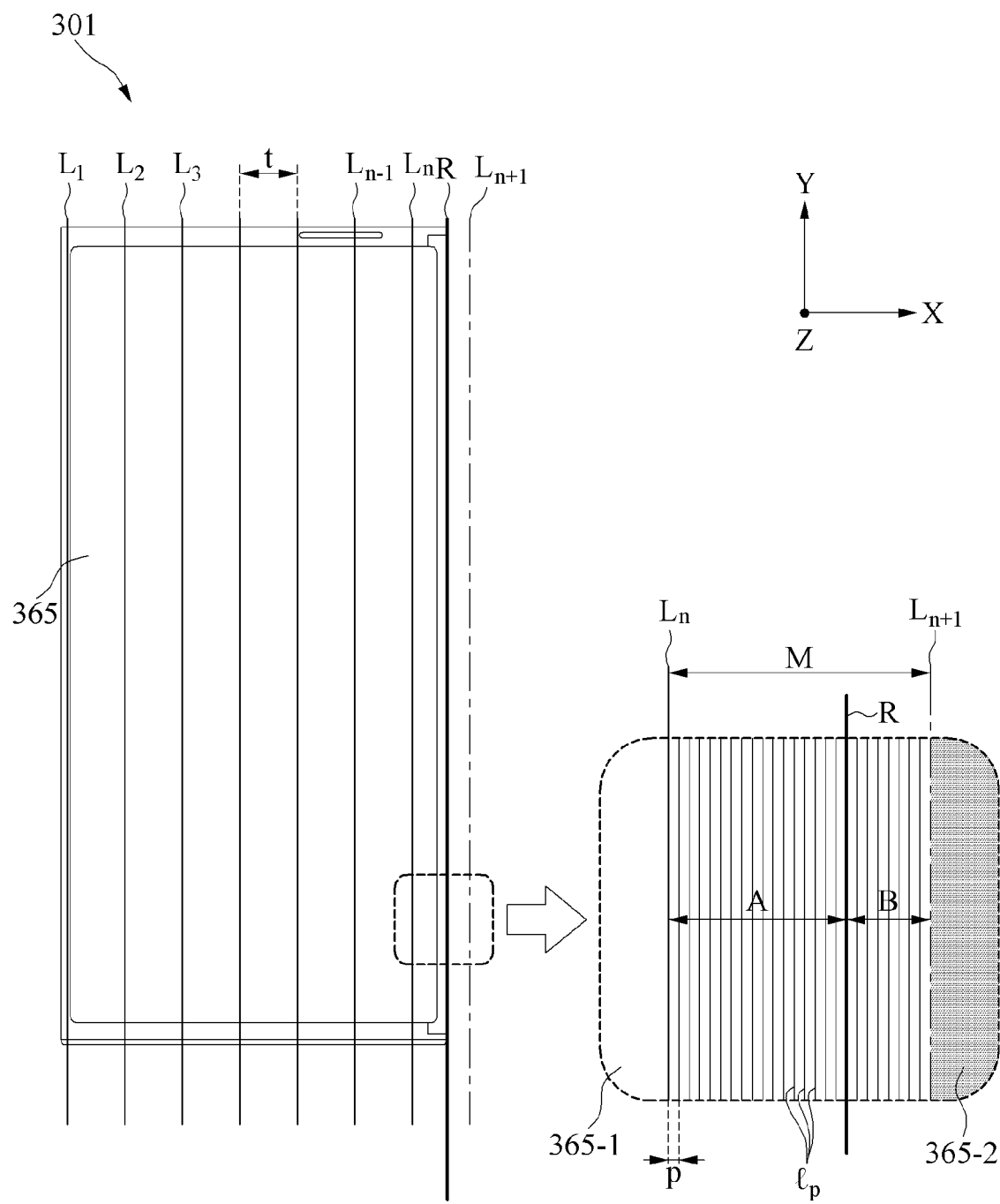
FIG. 3B is a diagram illustrating a front view of the electronic device according to various embodiments.

FIG. 3A is a cross-sectional view of an electronic device 301 according to various embodiments, and FIG. 3B is a diagram illustrating a front view of the electronic device 301 according to various embodiments.

Referring to FIGS. 3A and 3B, the electronic device 301 may include a touch screen panel (TSP) 365, a plurality of lines L1, L2, L3, . . . , Ln−1, Ln, Ln+1, (hereinafter, "Ln, Ln+1"), and a plurality of touch areas 365-1 and 365-2. Hereinafter, in the description of the electronic device 301 that expands and is reduced, any repeated description related to the electronic device 101 or 201 of FIGS. 1 to 2E may not be repeated.

In an embodiment, the electronic device 301 may include a first housing 310, a second housing 320, and a display 361, which may respectively correspond to the first housing 210, the second housing 220, and the display 261 of the electronic device 201 described with reference to FIGS. 1 to 2E, and may be replaced or modified within a scope that those skilled in the art may easily modify.

In an embodiment, the electronic device 301 may include the first housing 310 and the second housing 320, and the first housing 310 may move relative to the second housing 320 in an expansion direction (e.g., the +X direction) and a reduction direction (e.g., the −X direction). Alternatively, the second housing 320 may move relative to the first housing 301.

In an embodiment, the first housing 310 or the second housing 320 may include a slide cover 315 and based on the slide cover 315, the display 361 and/or the TSP 365 may be inserted into or withdrawn from the housing 310 or 320.

In an embodiment, as the electronic device 301 of FIGS. 3A and 3B moves in the expansion direction of the first housing 310, a partial area of the display 361 may be inserted into or withdrawn from an end of the electronic device 301 in a first direction (e.g., the +X direction), and the electronic device 301 may expand or may be reduced. However, the example is not limited thereto and as shown in FIGS. 2A to 2E, as the first housing 310 moves in the expansion direction, a partial area of the display 361 may be inserted into or may be withdrawn from an end of the electronic device 301 in a second direction (e.g., the −X direction) that is opposite to the first direction, and the electronic device 301 may expand or may be reduced.

In an embodiment, the TSP 365 may be connected in an opposite direction (e.g., the −Z direction) of a display direction (e.g., the +Z direction) of the display 361 and may be a flexible touch panel that may be bent or rolled together with the display 361. In an embodiment, the TSP 365 may include a touch sensor or a pressure sensor of a display module (e.g., the display module 160 of FIG. 1) and may be a component of an input module (e.g., the input module 120 of FIG. 1) of the electronic device 301. The TSP 365 may receive an input signal from an outside (e.g., a user) and may transmit to an internal component (e.g., the processor 120 of FIG. 1).

In an embodiment, the TSP 365 may include a plurality of touch areas 365-1 and 365-2 partitioned by a plurality of lines Ln and Ln+1, and as at least one of the first housing 310 or the second housing 320 relatively moves, at least a partial area of the plurality of touch areas 365-1 and 365-2 may be inserted into or may be withdrawn from the housing 310 or 320 of the electronic device 301.

Hereinafter, a direction in which the TSP 365 is withdrawn from the inside of the housing 310 or 320 in response to the expansion of the housing 310 or 320 may be a first direction and a direction in which the TSP 365 is inserted into the housing 310 or 320 in response to the reduction of the housing 310 or 320 may be a second direction. In an embodiment, based on the expansion directions of the housing 310 or 320 and the TSP 365, the first direction or the second direction may be directions respectively corresponding to the expansion and reduction of the housing 310 or 320, or may be respectively opposite directions.

In an embodiment, the plurality of lines Ln and Ln+1 may be a virtual boundary or wiring extending in a direction (e.g., the + and −Y directions) perpendicular to a direction in which the housing 310 or 320 expands or is reduced. In an embodiment, the plurality of lines Ln and Ln+1 may be spaced apart from each other at a predetermined interval t. For example, the plurality of lines Ln and Ln+1 may be wiring to turn on and off a partial area of the TSP 365 and the TSP 365 may turn off the partial area 365-2 of the plurality of touch areas 365-1 and 365-2 and may turn on the other area 365-1 in the unit of the plurality of lines Ln and Ln+1.

In an embodiment, a processor (e.g., the processor 120 of FIG. 1) may receive an expanded state of the housing 310 or 320 and/or a degree of withdrawal of the TSP 365 from an expansion sensor (not shown) that is a component of a sensor module (e.g., the sensor module 176 of FIG. 1). In an embodiment, the processor 120 may identify the degree of withdrawal of the TSP 365 based on an expansion numerical value or a reduction numerical value included in expansion and reduction commands of the housing 310 or 320 or a withdrawal numerical value or an insertion numerical value included in withdrawal and insertion commands of the TSP 365.

In an embodiment, based on the degree of withdrawal of the TSP 365, the processor 120 may select a reference line from the plurality of lines Ln and Ln+1, and may control a touch recognition area of the TSP 365 by controlling touch recognition of a partial area of the TSP 365 to be enabled or disabled based on the reference line, or may control the touch recognition area of the TSP 365 by restricting power supply to the partial area of the TSP 365.

In an embodiment, the processor 120 may identify the reference line that divides the plurality of touch areas 365-1 and 365-2 into an area enabling touch recognition and an area disabling touch recognition based on the expanded state of the housing 310 or 320 and/or the degree of withdrawal of the TSP 365. Of the plurality of touch areas 365-1 and 365-2, the processor 120 may enable touch recognition in the first area 365-1 that is a touch area in the first direction in which the TSP 365 is withdrawn and may disable touch recognition in the second area 365-2 that is a touch area in the second direction in which the TSP 365 is inserted based on the reference line.

In an embodiment, a method in which the processor 120 may enable touch recognition in the first area 365-1 and may disable touch recognition in the second area 365-2 may be variously implemented. For example, the processor 120 may control the power supply by hardware and may supply power to the first area 365-1 and may restrict the power supply to the second area 365-2. Alternatively, for example, the processor 120 may control touch recognition by software and may electrically disable touch recognition in the touch area 365-2 in the second direction of the plurality of touch areas 365-1 and 365-2.

Hereinafter, an internal component control entity of the TSP 365, the housing 310 or 320, and the electronic device 301 is omitted in the description. However, a control operation of the electronic device 301 in an embodiment may be executed by the processor 120, an auxiliary processor (e.g., the auxiliary processor 123 of FIG. 1), or a TSP processor (not shown).

In an embodiment, the TSP 365 may be controlled by interoperating with other components of the electronic device 301, such as a memory (e.g., the memory 130 of FIG. 1), a battery (e.g., the battery 189 of FIG. 1), or an input module (e.g., the input module 150 of FIG. 1).

In an embodiment, the reference line may be a line of the plurality of lines Ln and Ln+1, wherein the line is closest to boundary of the outside of the housing 310 or 320 of the electronic device 301. For example, the n-th line Ln may be exposed to the outside of the housing 310 or 320 and the n+1-th line Ln+1 may be inside the housing 310 or 320. In this case, the n+1-th line Ln+1 may be identified by the reference line, and based on the n+1-th line Ln+1, power may be supplied to the first area 365-1 and power supply may be restricted to the second area 365-2.

In an embodiment, a touch area contacting the reference line (e.g., the n+1-th line Ln+1) in the first area 365-1 may be a boundary area M. In the boundary area M, as the housing 310 or 320 of the plurality of touch areas 365-1 and 365-2 of the TSP 365 expands, a partial area B may be disposed inside the housing 310 or 320, and the other partial area A may be disposed in the outside of the housing 310 or 320.

In an embodiment, in the plurality of touch areas 365-1 and 365-2, the boundary area M may be a touch area contacting the reference line Ln+1 in the touch area in the first direction. The boundary area M may include a touch recognition restriction portion B that is a partial area adjacent to the reference line and a touch recognition portion A that excludes the touch recognition restriction portion B.

In an embodiment, the housing 310 or 320 may include a boundary R (or a boundary line R) that is a boundary from which the display 361 or the TSP 365 is withdrawn from the inside the housing 310 or 320 to the outside or is inserted into the housing 310 or 320 from the outside. For example, the boundary R may be a virtual line of the TSP 365 facing an end oriented to an outer area of the slide cover 315 of the first housing 310. Alternatively, for example, the boundary R may be a boundary partitioning the inside and outside of the housing 310 or 320. Alternatively, for example, the boundary R may be a line contacting the TSP 365 in the housing 310 or 320 in an area in which the TSP 365 is exposed to the outside of the housing 310 or 320.

In an embodiment, a shape of the boundary R may be a straight line or a curved line depending on a shape of the boundary of the slide cover 315 and may be parallel or substantially parallel with the plurality of lines Ln and Ln+1. In an embodiment, in the boundary area M, a partial area in the first direction may be the touch recognition portion A, and a partial area in the second direction may be the touch recognition restriction portion B, based on the boundary R.

In an embodiment, the boundary area M may be an area facing the boundary R of the plurality of touch areas 365-1 and 365-2, an area occluded by the inside of the housing 310 or 320 may be the touch recognition restriction area B, and an area exposed to the outside of the housing 310 or 320 may be the touch recognition area.

In an embodiment, the touch recognition restriction portion B may restrict touch recognition. For example, the processor 120 may block, ignore, or reject touch recognition of the touch recognition restriction portion B. Alternatively, the processor 120 may lower the sensitivity of touch recognition of the touch recognition restriction portion B.

In an embodiment, the touch recognition restriction portion B of the boundary area M may occluded by the inside of the housing 310 or 320, thereby a touch may be mistakenly input although a user or an external system does not input the touch. For example, the touch recognition restriction portion B may be touched by the slide cover 315 or a touch may be recognized by a foreign substance entering between the slide cover 315 and the TSP 365. Alternatively, as the display 361 expands or is reduced, an area adjacent to the boundary R may pop out, and in the corresponding area, a ghost touch that is not input by a user may be recognized as the TSP 365 contacts the housing 310 or 320, the slide cover 315 disposed around the TSP 365, or a metallic material.

For example, in an embodiment, when the power supply to the two wiring lines Ln and Ln+1 is blocked, a touch input may be disabled in a partial area and when power is supplied to both of the wiring lines Ln and Ln+1, an unnecessary touch may occur in the housing 310 or 320. To prevent and/or reduce this, in an embodiment, when an interval of the wiring lines Ln and Ln+1 of the TSP 365 is manufactured and controlled to match coordinates or a pixel interval of the display 361, a manufacturing cost may increase and current consumption may increase.

The electronic device 301 and a control method S100 thereof (refers to FIG. 4) in an embodiment of the present disclosure may prevent and/or reduce an unnecessary ghost touch by controlling the sensitivity of the touch recognition restriction portion B disposed in the housing 310 or 320 among the boundary area M of the TSP 365 and may reduce power consumption by minimizing and/or reducing touch recognition in an area in which touch recognition is not needed.

In an embodiment, the power of the plurality of touch areas 365-1 and 365-2 may be controlled based on the plurality of lines Ln and Ln+1 and each touch area may include a plurality of slide lines $l_p$ arranged in an interval p that is narrower than the interval t of the plurality of lines Ln and Ln+1. The slide line $l_p$ may be a minimum movement interval that the first housing 310 may move or a minimum movement interval that the sensor module 176 may recognize.

In an embodiment, when the plurality of lines Ln and Ln+1 is wiring lines of the TSP 365, an interval of the plurality of lines Ln and Ln+1 may be limited to a preset value t. When the plurality of lines Ln and Ln+1 is arranged at an interval that is less than or equal to the preset value t, a product cost of the TSP 365 may increase as the number of wires increases, interference between sub-channels may occur, manufacturing difficulty may increase, and a yield may decrease.

In an embodiment, a minimum interval (e.g., an interval range p of the slide line $l_p$) of expansion of the housing 310 or 320 may be less than a wiring interval of the plurality of lines Ln and Ln+1. When the housing 310 or 320 moves between the plurality of lines Ln and Ln+1, the boundary R may be disposed inside the touch area. The electronic device 301 and the control method S100 thereof in an embodiment may prevent and/or reduce a ghost touch while maintaining a wiring interval by blocking or rejecting touch of the touch recognition restriction portion B disposed inside based on the boundary R or controlling to lower a sensitivity value and may improve the touch accuracy.

For example, a width (e.g., a length in + and − directions) in the expansion direction of the display 361 of the electronic device 301 may be 120.4 mm and X resolution of the TSP 365 may be designed to be a value of 4096. In this case, a minimum interval of touch recognition of the TSP 365 may be 0.029 mm obtained by dividing the width and may have a significantly fine pixel interval. The TSP 365 may be designed to have a resolution within 1 mm for precise touch recognition to correspond to the fine pixel interval.

In an embodiment, a slide unit interval in which the housing 310 or 320 moves may be narrower than the wiring interval t of the TSP 365, and for example, may correspond to the interval range p of the slide line $l_p$. When the power supply to the touch area is controlled based on the wiring interval t of the TSP 365, the partial area A of the TSP 365 may be disposed to the outside of the housing 310 or 320 in response to slight slide movement and may require touch recognition. However, the other area B may be occluded by the inside of the housing 310 or 320 and may not require touch recognition, and a ghost touch problem that an unnecessary touch is sensed may occur.

In an embodiment, designing and manufacturing the wiring interval t of the TSP 365 to be less or equal to a 1 mm unit may decrease efficiency. Therefore, resolution may be designed based on the interval range p of the slide line $l_p$ and slight touch sensitivity of the TSP 365 may be controlled. The interval t of the TSP 365 in which the plurality of lines Ln and Ln+1 is spaced apart from each other may be maintained to be 4 mm and the interval range p of the slide line $l_p$ in the touch area partitioned by the interval t may be designed within 1 mm, thereby touch recognition of the touch recognition restriction portion B may be precisely controlled.

The electronic device 301 and the control method S100 thereof in an embodiment of the present disclosure may maintain a wiring interval of the plurality of lines Ln and Ln+1 of the TSP 365, may finely control touch recognition of the touch recognition restriction portion B disposed in the housing 310 or 320, thereby may prevent and/or reduce a ghost touch, and may secure economic feasibility of manufacturing of the electronic device 301.

In an embodiment, an area of the display 361 of the electronic device 301 may include an edge area provided at an end (e.g., an + and/or −X direction end). When power supply to the boundary area M is restricted in bulk, touch recognition of the edge area may be restricted and utilization of the edge area may be limited. In this case, the partial area A may utilize the edge area by supplying power to the TSP 365, and the other area B may prevent and/or reduce unnecessary touch recognition by adjusting the touch sensitivity.

Hereinafter, a control method S100 of the electronic device 301 is described and any repeated description provided with reference to FIGS. 1 to 3B may not be provided. The control method S100 of the electronic device 301 described below may be implemented by a processor (e.g., the processor 120 of FIG. 1) of the electronic device 301 or may be implemented by an external system (not shown) or a user. For example, the control method S100 of the electronic device 301 may target the electronic device 301 including the housing 310 or 320 that expands and is reduced while one housing 310 moves relative to the other housing 320, the display 261 of which a screen display area is adjusted when the housing 310 or 320 expands or is reduced, the memory 130 in which instructions executable by a computer are stored, the processor 120 executing instructions by accessing the memory 130, and the TSP 365 that is withdrawn from or is inserted into the housing 310 or 320 as the housing 310 or 320 expands or is reduced.

Figure 4:
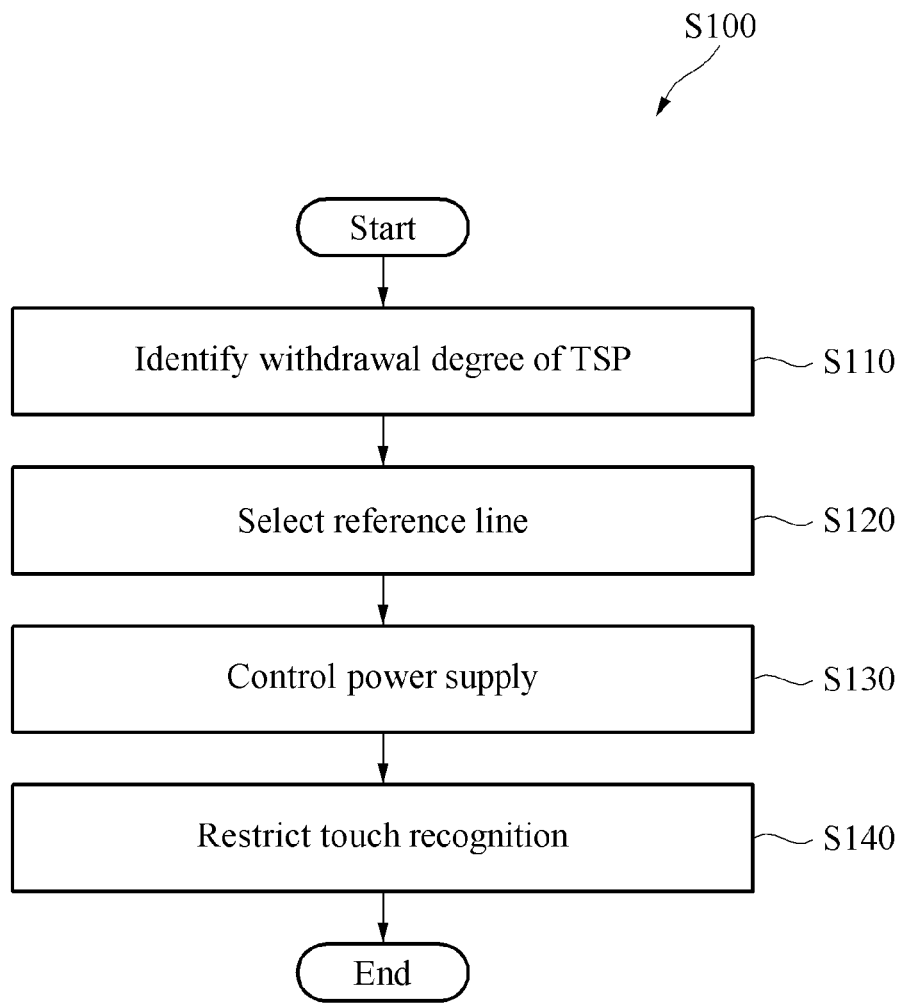
FIG. 4 is a flowchart illustrating an example method of controlling an electronic device according to various embodiments.
Figure 5:
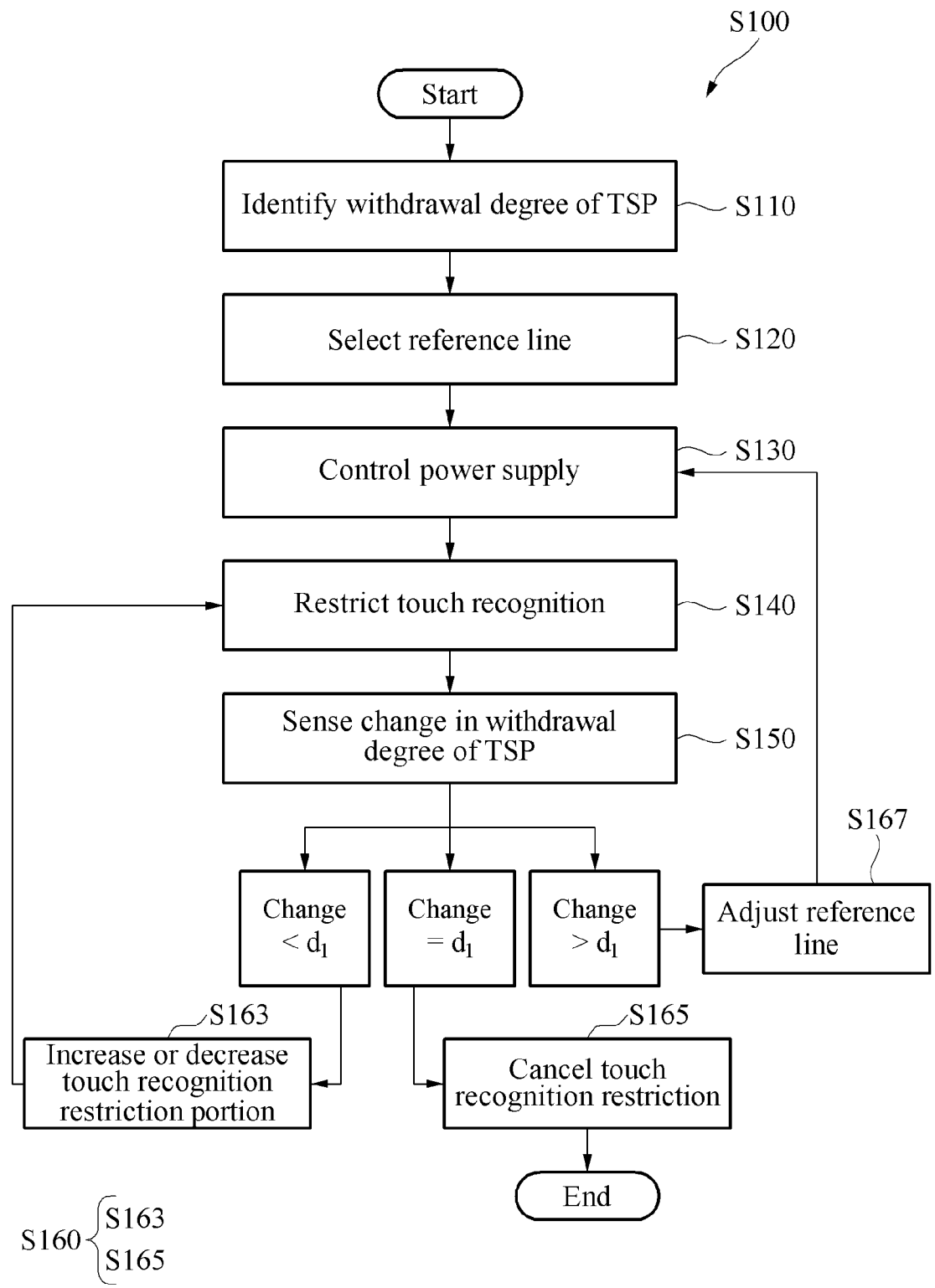
FIG. 5 is a flowchart illustrating an example method of controlling an electronic device according to various embodiments.
Figure 10:
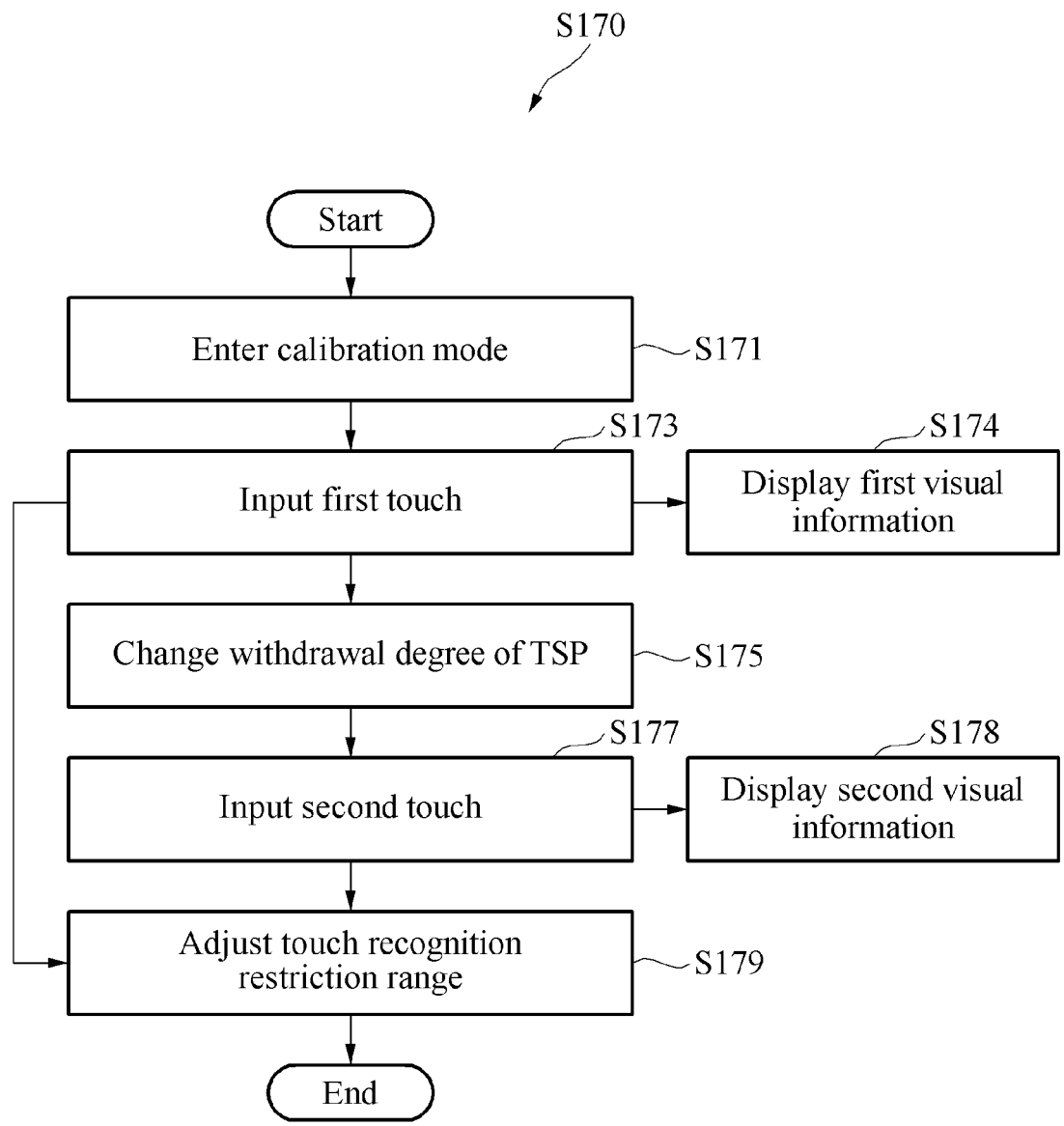
FIG. 10 is a flowchart illustrating an example method of controlling an electronic device according to various embodiments.

A plurality of operations described below may be sequentially performed as shown in FIGS. 4, 5, and 10, but is not limited thereto. The order of at least some operations may change, some operations may be omitted, or other operations may be added thereto.

FIG. 4 is a flowchart illustrating an example method S100 of controlling the electronic device 301 according to various embodiments.

Referring to FIG. 4, the control method S100 of the electronic device 301 may include at least one of a withdrawal and insertion degree of the TSP 365 identification operation S110, a reference line selection operation S120, a power supply control operation S130, and a touch recognition restriction operation S140.

In an embodiment, the withdrawal degree of the TSP 365 identification operation S110 may identify the degree of withdrawal of the TSP 365 from the housing 310 or 320 in response to the expansion of the housing 310 or 320 or the degree of insertion into the housing 310 or 320, or may recognize an expanded state of the housing 310 or 320 that expands and is reduced.

In an embodiment, in the electronic device 301, relative to one housing 320, the other housing 310 may expand or may be reduced by sliding the other housing 310, and for example, a screen display area of the display 361 may expand or may be reduced as the first housing 310 or the second housing 320 moves. When the housing 310 or 320 expands or is reduced, in interoperation therewith, the TSP 365 may be withdrawn from the housing 310 or 320 or may be inserted into the housing 310 or 320. Identification of the degree of withdrawal of the TSP 365 may be performed by a sensor module (e.g., a slide sensor (not shown) of the sensor module 176 of FIG. 1 or an expansion sensor (not shown)), and the sensor module 176 may provide a sensing result to the processor 120 by sensing the withdrawal degree of the TSP 365 and/or the expanded state of the first housing 310.

In an embodiment, the reference line selection operation S120 may select a reference line to control a power supply range in the plurality of touch areas 365-1 and 365-2 of the TSP 365 based on the withdrawal degree of the TSP 365 in the plurality of touch areas 365-1 and 365-2 partitioned by the plurality of lines Ln and Ln+1 of the TSP 365. Alternatively, the reference line may be the reference of an area enabling touch recognition and an area disabling touch recognition in the plurality of touch areas 365-1 and 365-2.

In an embodiment, based on the reference line, the power supply control method S130 may supply power (or enable touch recognition) to the first area 365-1, which is the touch area in the first direction in which the TSP 365 is withdrawn from the housing 310 or 320, of the plurality of touch areas 365-1 and 365-2 and may block power to the second area 365-2, which is the touch area in the second direction in which the TSP 365 is inserted into the housing 310 or 320.

In an embodiment, the reference line may be a closest line of the plurality of lines Ln and Ln+1 in the second direction from the boundary R shown in FIG. 3A. The TSP 365 may restrict power supply to a partial area that does not need touch recognition based on the reference line. The control method S100 of the electronic device 301 in an embodiment may prevent and/or reduce unnecessary touch recognition of the electronic device 301 by turning off the power of the second area 365-2, may reduce the power consumption of the electronic device 301, and may secure battery efficiency. Alternatively, the processor 120 may electrically block or reject touch recognition of the second area 365-2 or may disable touch recognition of the second area 365-2 by lowering the touch sensitivity.

In an embodiment, the operation S140 of restricting touch recognition may restrict touch recognition of the touch recognition restriction portion B, which is a partial area adjacent to the reference line in the boundary area M, which is a touch area contacting the reference line, of the first area 365-1.

In an embodiment, the touch recognition restriction portion B may be a portion extending from the reference line in the boundary area M, which is a touch area contacting the reference line in the touch area in the first direction to which power is supplied. Alternatively, the touch recognition restriction portion B may be a partial area occluded by the housing 310 or 320 based on the boundary R in the boundary area M and may be a partial area in which the display 361 is occluded from the outside by the slide cover 315 in the boundary area M. Alternatively, the touch recognition restriction portion B may be a partial area of the TSP 365 in which touch recognition is unnecessary depending on a use environment.

The control method S100 of the electronic device 301 in an embodiment may block and/or reject touch recognition of the touch recognition restriction portion B, may prevent and/or reduce unnecessary touch recognition in advance by lowering the sensitivity of touch recognition, and may prevent and/or reduce a ghost touch. A detailed example and effect of the control method S100 of the electronic device 301 in an embodiment may be identically or similarly applied with reference to the descriptions of the electronic device 301 of FIGS. 3A and 3B.

FIG. 5 is a flowchart illustrating an example method S100 of controlling the electronic device 301 according to various embodiments.

Referring to FIG. 5, the electronic device 301 in an embodiment may include a TSP 365's withdrawal and insertion change sensing operation S150 as a degree of withdrawal and insertion of the TSP 365 changes and a TSP 365 readjustment operation S160.

In an embodiment, the TSP 365's withdrawal and insertion change sensing operation S150 may sense a change in withdrawal and insertion of the TSP 365 after the operation S140 of restricting touch recognition, may identify a change in an expanded state of the housing 310 or 320, or may update a change state of the TSP 365.

For example, a sensor module (e.g., the sensor module 176 of FIG. 1) may sense a movement state of the first housing 310 in real-time or at a predetermined time interval and may provide a sensing result to a processor (e.g., the processor 120 of FIG. 1), and the processor 120 may adjust a screen display area of the display 361 based on the sensing result, may adjust a range of the touch recognition restriction portion B of the TSP 365, and may change the boundary area M.

In an embodiment, after the TSP 365's withdrawal and insertion change sensing operation S150, various TSP 365 readjustment operations S160 may be performed according to a size relationship between a preset value $d_1$ and a change in a withdrawal and insertion degree of the TSP 365 that is the sensing result of the TSP 365's withdrawal and insertion change sensing operation S150.

In an embodiment, the preset value $d_1$ may vary based on a range occupied by the touch recognition restriction portion B in the boundary area M. For example, the preset value $d_1$ may be a width (e.g., the X-axis length) of the touch recognition restriction portion B or a distance from a boundary (e.g., the boundary R of FIG. 3A) to a reference line (E.g., the n+1-th line Ln+1 of FIG. 3A).

In an embodiment, the TSP 365 readjustment operation S160 may control power supply to a partial area of the TSP 365 by comparing a current width (e.g., $d_1$) of the touch recognition restriction portion B with a distance in which the first housing 310 moves, may control the touch recognition restriction range, or may control the touch sensitivity.

In an embodiment, when the change that the TSP 365 is withdrawn or inserted is less than the preset value $d_1$, in the TSP 365 readjustment operation S160, the processor 120 may perform an operation S163 that increases or decreases a range of the touch recognition restriction portion B based on a change.

In an embodiment, when the change that the TSP 365 is withdrawn or inserted is less than the preset value $d_1$ that is the width of the touch recognition restriction portion B, the processor 120 may increase or decrease the range of the touch recognition restriction portion B in proportion to the change.

For example, when the TSP 365 is withdrawn by a value that is less than the preset value $d_1$, the range of the touch recognition restriction portion B may increase in response to the withdrawal range, and when the TSP 365 is inserted by a value that is less than the preset value $d_1$, the range of the touch recognition restriction portion B may decrease in response to the insertion range.

In an embodiment, the increased or decreased range of the touch recognition restriction portion B may be an area from the boundary R to the reference line in the boundary area M in the updated state. For example, when the TSP 365 is disposed in the boundary area M with the same boundary R even after the TSP 365 is withdrawn or inserted, the processor 120 may determine to increase or decrease the range of the touch recognition restriction range B to correspond to a position of the boundary R.

In an embodiment, after the operation S163, which increases or decreases the range of the touch recognition restriction portion B, the processor 120 may perform an operation S140 that restricts touch recognition of the touch recognition restriction portion B based on a new touch recognition restriction portion B.

In an embodiment, when the change in the expanded state is the same as the preset value, the processor 120 may perform a touch recognition restriction cancellation operation S165 that cancels the touch recognition restriction portion B.

For example, when the change that the TSP 365 is withdrawn or inserted is the same or substantially the same as the preset value $d_1$ that is the width of the touch recognition restriction portion B, the processor 120 may modify the reference line and may cancel the touch recognition restriction portion B in the boundary area M. Thereafter, the processor 120 may terminate a control operation of the TSP 365 according to the control method S100 described above or may perform the operation S110 that recognizes a change where the TSP 365 is withdrawn or inserted.

In an embodiment, when the touch recognition restriction portion B is canceled, the processor 120 may recognize a touch operation in all areas of the boundary area M and then the processor 120 may sense a change in new expansion or may monitor this in real time.

For example, when the first housing 310 moves and the TSP 365 is withdrawn or inserted, and the boundary R is positioned at the same position as the reference line, the processor 120 may cancel the touch recognition restriction portion B and may recognize a touch in the same manner as the other first area 365-1 in the entire boundary area M.

In an embodiment, when a change in withdrawal and insertion of the TSP 365 exceeds a preset value, the processor 120 may perform an operation S167 of adjusting the reference line and the boundary area M based on the change. For example, when a moving distance of the housing 310 is greater than the width of the touch recognition restriction portion B, the processor 120 may adjust the reference to be reset and the boundary area M may change.

In an embodiment, the processor 120 may perform the power supply control operation S130 again based on the changed reference line and may perform at least one of the following operations S140 and S150 again. In an embodiment, based on a new reference line, power may be supplied to the first area 365-1 of the TSP 365, the power supply may be restricted to the second area 365-2, and touch recognition of the touch recognition restriction portion B may be restricted.

For example, when the boundary R is positioned in the other touch area as the first housing 310 moves, the processor 120 may adjust the reference line to correspond to the position of the boundary R and may adjust the boundary area M and the touch recognition restriction portion B.

FIGS. 6A, 7A, 8A, and 9A are diagrams illustrating plan views of the TSP 365 according to various embodiments, and FIGS. 6B, 7B, 8B, and 9B are cross-sectional views of the electronic device 301 according to various embodiments.

Referring to FIGS. 6A to 9B, an operation of the processor 120 to control the TSP 365 as the electronic device 301 in an embodiment gradually expands within a preset gap interval t of the plurality of lines Ln and Ln+1 is described.

In the descriptions of FIGS. 6A to 9B, the description of the electronic device 101, 201, or 301 in an embodiment and the control method S100 thereof may be omitted or briefly described, some operations may be added or omitted or may be modified and implemented within a scope apparent to those skilled in the art.

In an embodiment, in the electronic device 301, the first housing 310 may move in an expansion direction (e.g., the +X direction) and a reduction direction (e.g., the −X direction) relative to the second housing 320, and the TSP 365 may be withdrawn from the housing 310 or 320 or may be inserted into the housing 310 or 320 in response to the movement of the first housing 310. In the electronic device 301, a partial area 351-1 of the TSP 365 may be exposed to the outside of the housing 310 or 320 and the other area 351-2 of the TSP 365 may include a boundary R that is a reference line occluded by the housing 310 or 320.

For example, the housing 310 or 320 may include a slide cover 315 provided in an edge area of one end of the electronic device 301, at least a partial area of the TSP 365 may be occluded by the slide cover 315, and in this case, one end of the slide cover 315 may correspond to the boundary R.

In an embodiment, FIGS. 6A to 9B are views illustrating a process in which the reference line moves from a line Ln of a plurality of lines Ln and Ln+1 to an adjacent line Ln+1 as the housing 310 or 320 expands, and changes in the electronic device 301 and the TSP 365 of FIGS. 6A to 9B may be sequentially performed, or at least a portion thereof may be omitted, or performed in a different order. Alternatively, FIGS. 6A to 9B are views illustrating an expansion process caused by the movement of the housing 310 or 320 within a range of the gap interval t of the plurality of lines Ln and Ln+1, and in an actual implementation, the movement of the housing 310 and the TSP 365 may be within a fine range, for example, an expansion of about 1 mm.

Figure 6A:
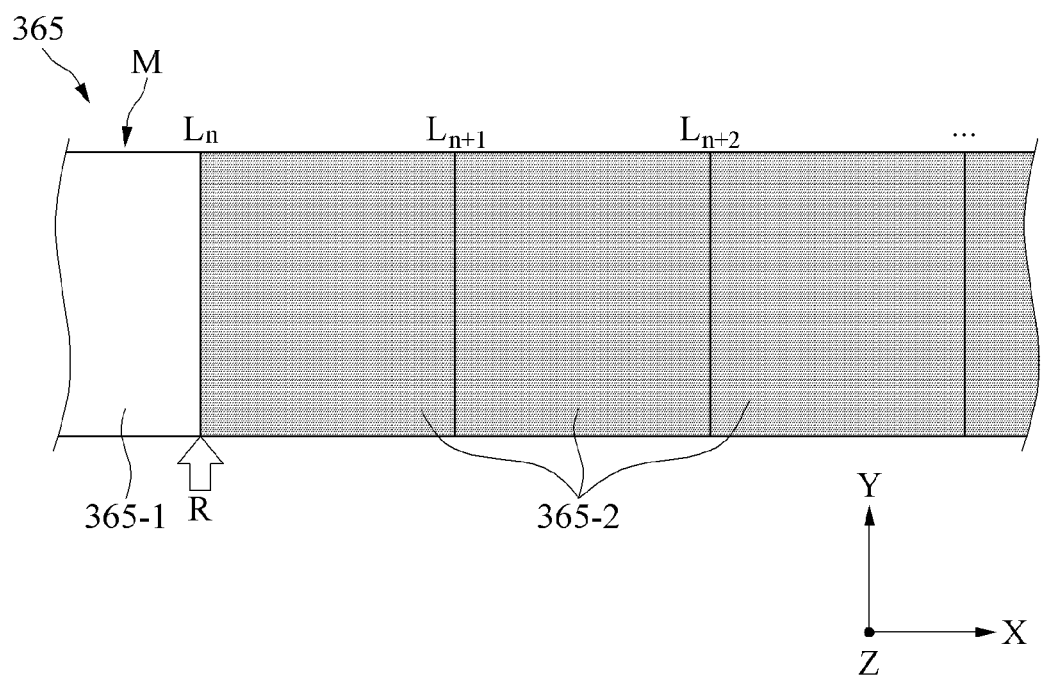
FIG. 6A is a diagram illustrating a plan view of a touch screen panel (TSP) according to various embodiments.
Figure 6B:
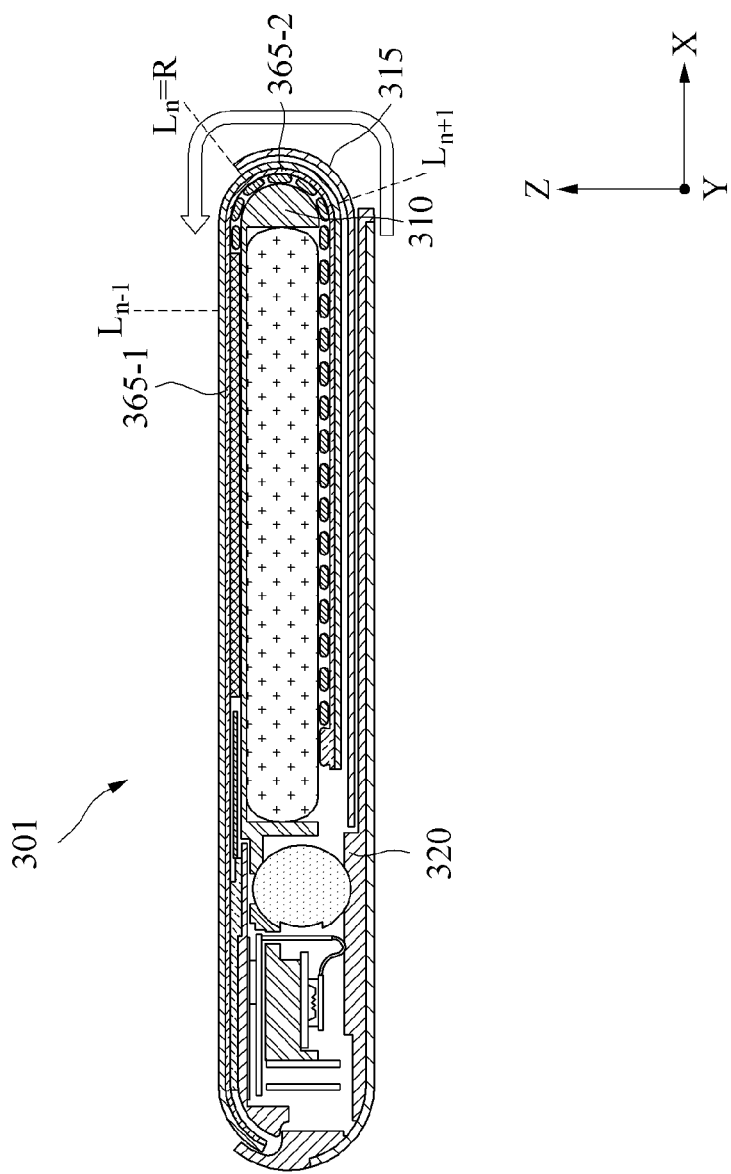
FIG. 6B is a cross-sectional view of an electronic device according to various embodiments.

In an embodiment, as shown in FIGS. 6A and 6B, one (e.g., an n-th line Ln) of the plurality of lines Ln−1, Ln, Ln+1, Ln+2, hereinafter, "Ln and Ln+1") may be the same as the boundary R, and power may be supplied or restricted to touch areas 351-1 and 351-2 in both sides based on the boundary R.

For example, the TSP 365 may include the plurality of lines Ln and Ln+1 and may include a plurality of touch areas 365-1 and 365-2 partitioned based on the plurality of lines Ln and Ln+1. At least a partial area of the plurality of touch areas 365-1 and 365-2 may be disposed in the housing 310 or 320, and a corresponding area of the TSP 365 may not be supplied with power. For example, the TSP 365 may supply power to the touch area 351-1 in the first direction based on the reference line and may not supply power to the second area 365-2.

Figure 7A:
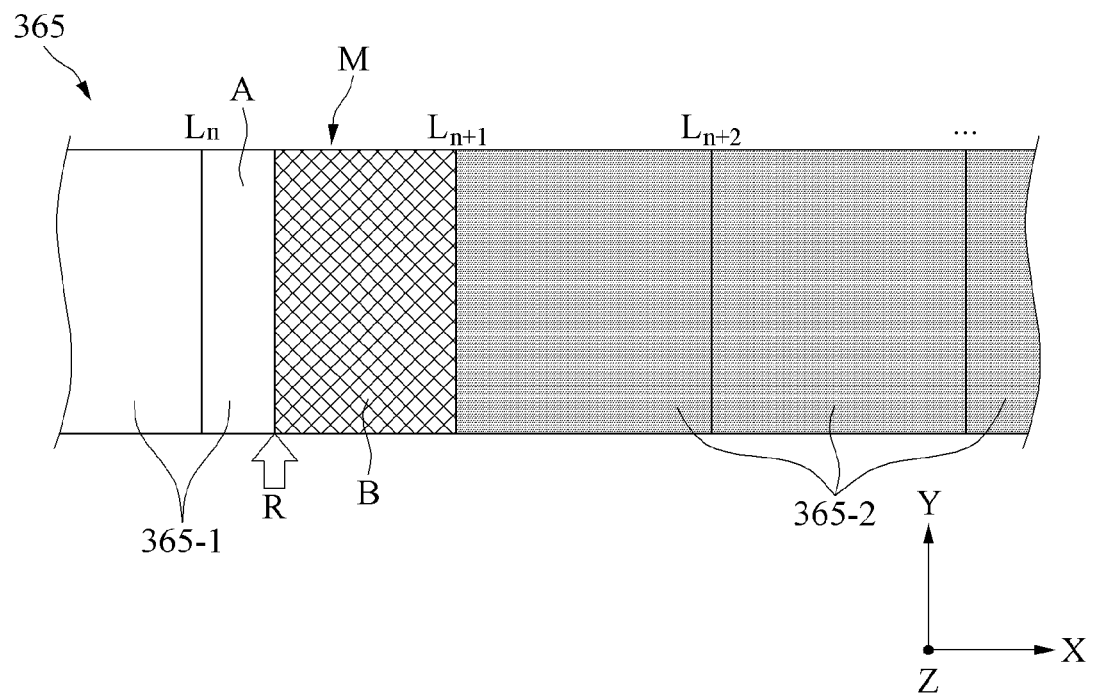
FIG. 7A is a diagram illustrating a plan view of a TSP according to various embodiments.
Figure 7B:
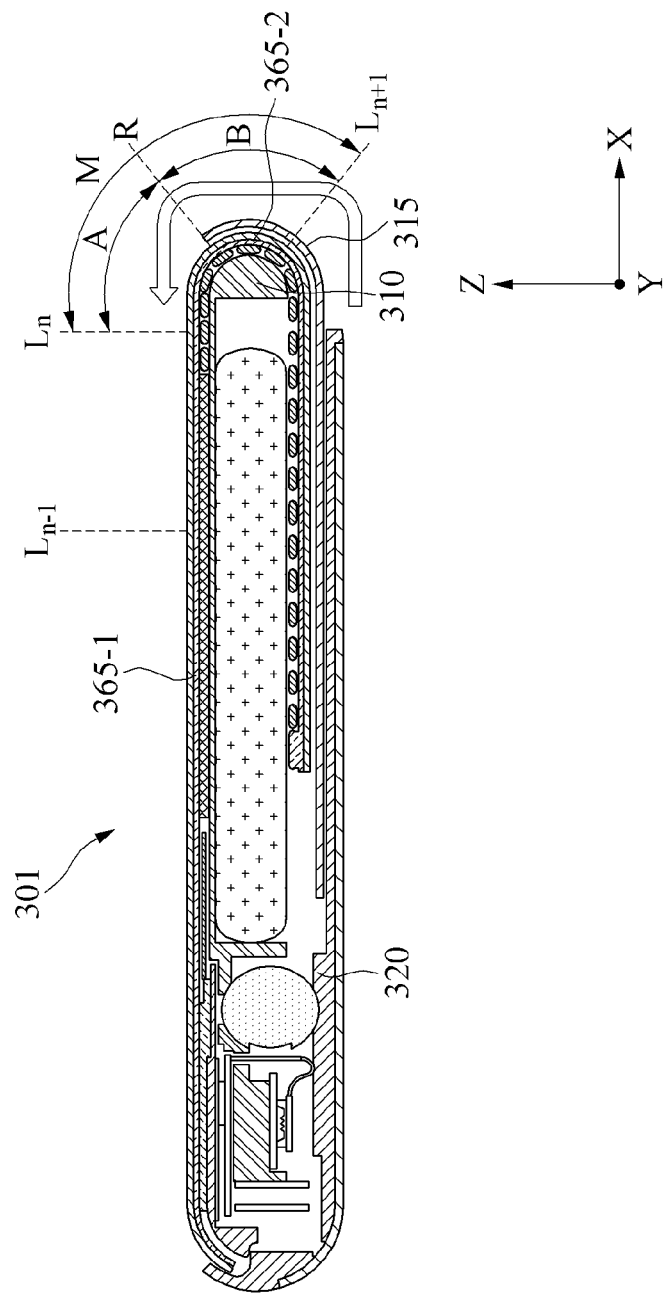
FIG. 7B is a cross-sectional view of an electronic device according to various embodiments.

In an embodiment, as shown in FIGS. 7A and 7B, the first housing 310 may move by less than or equal to a preset value in the expansion direction. For example, the preset value may be an interval (e.g., the interval t of FIG. 3B) in which the plurality of lines Ln and Ln+1 is spaced apart from each other, and the first housing 310 may move by an interval (e.g., the slide line $l_p$ of FIG. 3B) that is less than the preset value t. In this case, the boundary R may be disposed between the plurality of lines Ln and Ln+1, the boundary R may be disposed in one (e.g., the boundary area M) of the plurality of touch areas 365-1 and 365-2.

In an embodiment, the processor 120 may control touch recognition of the TSP 365 based on a moving distance of the housing 310 or an expanded state of the display 361 or the TSP 365, and the processor 120 may set a reference line to control the TSP 365. In an embodiment, based on an identification result of a degree of withdrawal of the TSP 365, the reference line may be one line closest to the boundary R that the TSP 365 is withdrawn or inserted in the second direction in which the TSP 365 is inserted into the housing 310 or 320 from the boundary R.

For example, a line that is in contact with the boundary R in the plurality of touch areas 365-1 and 365-2 of the TSP 365, or a line that is closest to the boundary R based on the boundary R in the first area 365-1, or a line of the plurality of lines Ln and Ln+1 that is closest to the outside of the housing 310 or 320 in the housing 310 or 320 may be identified as the reference line. In the TSP 365, in the boundary area M, which is the touch area in which the boundary R is positioned, power may be provided, and the processor 120 may divide the boundary area M into a plurality of areas A and B and may respectively control touch recognition thereof. In an embodiment, the reference line may be a line that relatively varies depending on a withdrawal and insertion state of the TSP 365.

In an embodiment, the processor 120 may supply power to the area A in the first direction in the boundary area M based on the boundary R in the same manner as the other first area 365-1 and may recognize a touch. In addition, the processor 120 may restrict touch recognition in the touch recognition restriction portion B, which is the area B in the second direction in the boundary area M based on the boundary R.

In an embodiment, the touch recognition restriction portion B may be disposed inside the housing 310 or 320 or may be occluded by the slide cover 315 from the outside, thereby an incorrect touch recognition problem (e.g., a ghost touch) may be addressed by restricting or blocking touch recognition. In addition, the electronic device 301 in an embodiment may address a touch recognition problem without narrowing the wiring interval t between the plurality of lines Ln and Ln+1 by setting the touch recognition restriction portion B and increasing the plurality of lines Ln and Ln+1 and may secure the manufacturing difficulty level and economic feasibility of the electronic device 301.

Figure 8A:
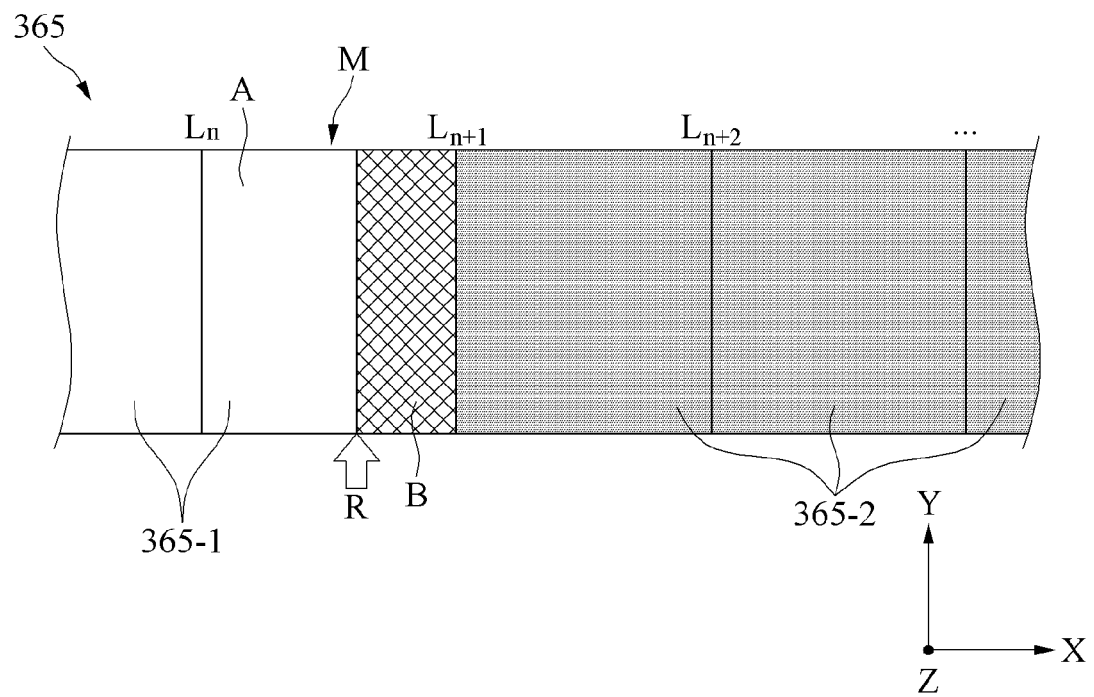
FIG. 8A is a diagram illustrating a plan view of a touch screen panel (TSP) according to various embodiments.
Figure 8B:
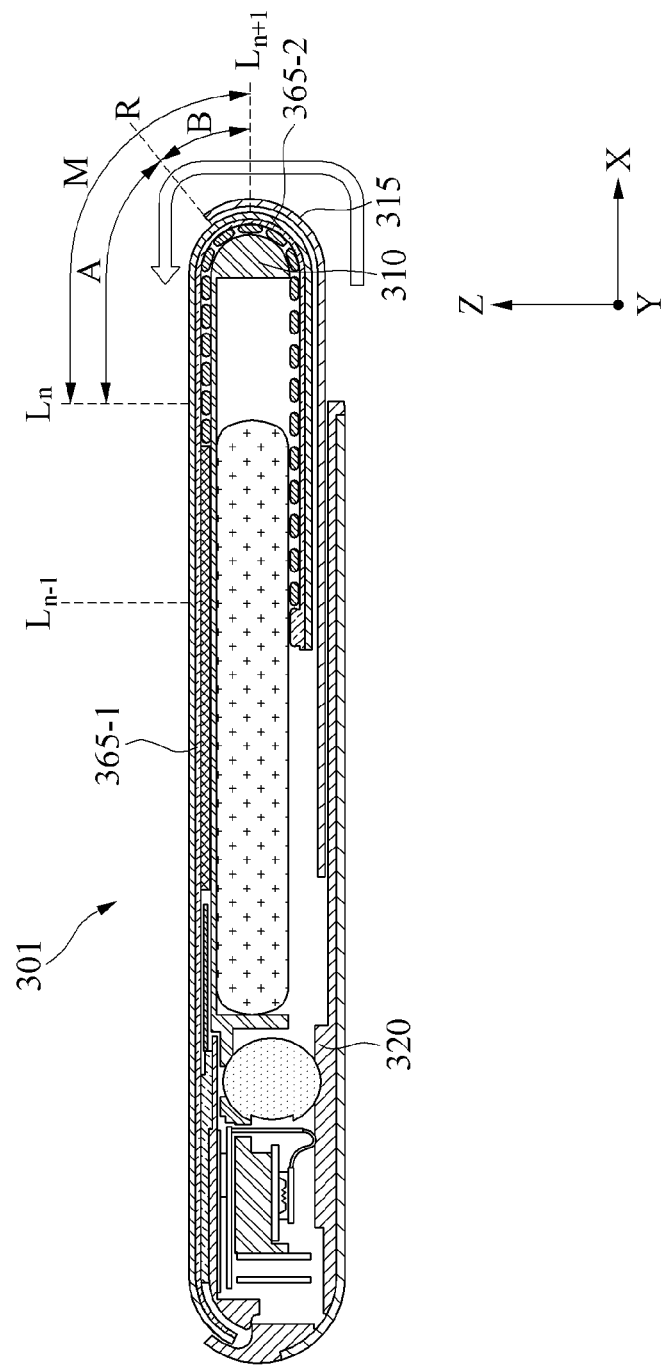
FIG. 8B is a cross-sectional view of an electronic device according to various embodiments.

In an embodiment, as shown in FIGS. 8A and 8B, the first housing 310 may move by less than or equal to a preset value in the expansion direction, and the TSP 365 may be withdrawn or inserted by less than or equal to the preset value. For example, in the state of FIG. 6B or FIG. 7B, the first housing 310 may move by less than a distance (e.g., the width of B in the x-axis direction) from the boundary R to the adjacent line Ln+1 in the second direction. The boundary R may be disposed between the plurality of lines Ln and Ln+1 and may be disposed inside one of the plurality of touch areas 365-1 and 365-2.

In an embodiment, the processor 120 may update a change of a withdrawal and insertion state of the TSP 365 and the change may be recognized by less than a preset value. In this case, the preset value may be a distance from the boundary R to an adjacent plurality of lines Ln and Ln+1.

In an embodiment, when the change in withdrawal and insertion of the TSP 365 is less than the preset value, the processor 120 may increase a range of the touch recognition restriction portion B based on the change. For example, the touch recognition restriction portion B may be a partial area from the boundary R to the reference line Ln+1 in the boundary area M.

Figure 9A:
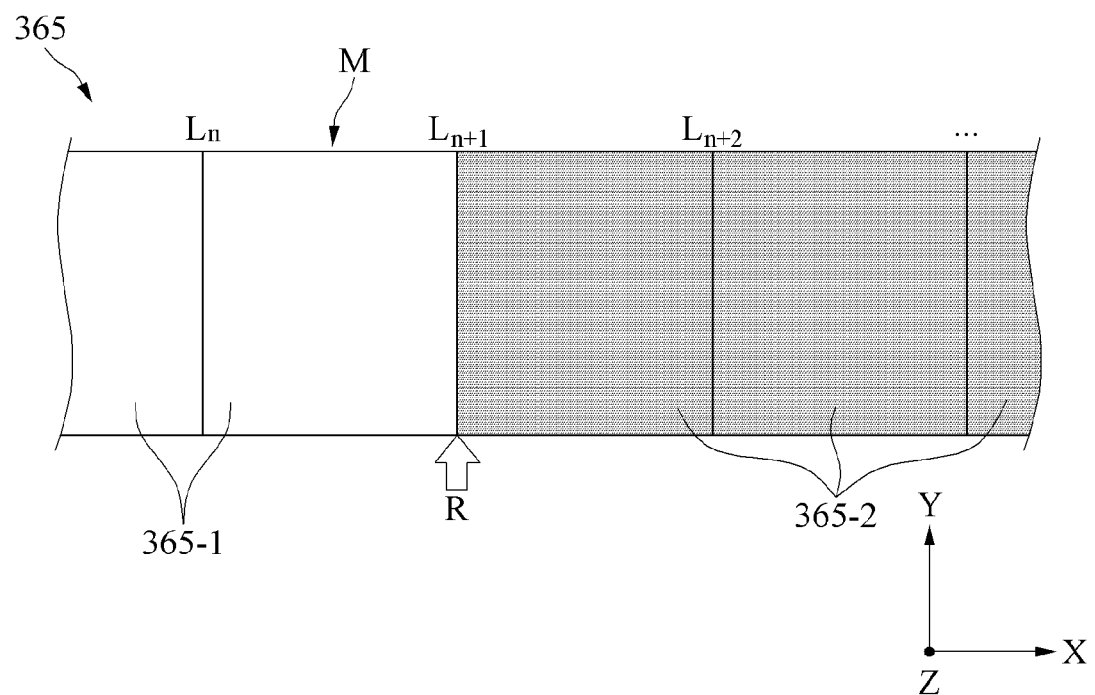
FIG. 9A is a diagram illustrating a plan view of a TSP according to various embodiments.
Figure 9B:
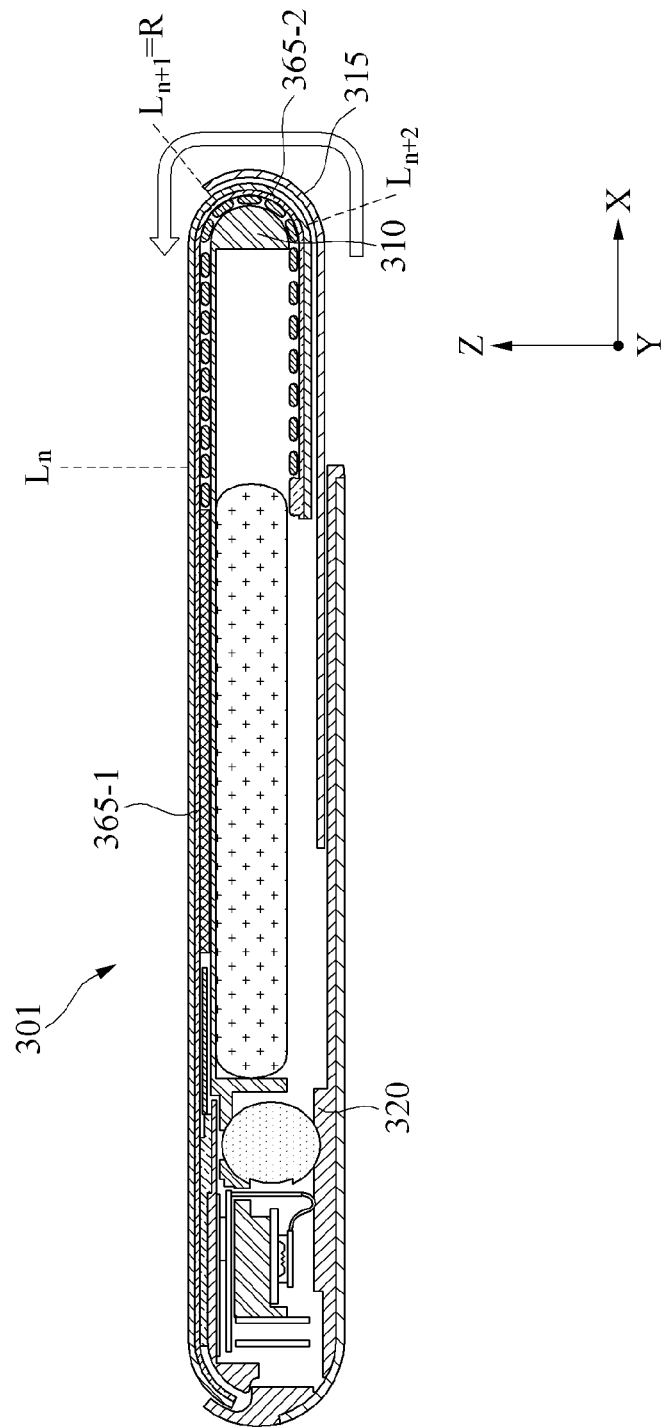
FIG. 9B is a cross-sectional view of an electronic device according to various embodiments.

In an embodiment, as shown in FIGS. 9A and 9B, the first housing 310 may move by a preset value in the expansion direction, and the TSP 365 may be withdrawn or inserted by substantially the same as the preset value. For example, in the expanded state of FIG. 6B, the expanded state of FIG. 7B, or the expanded state of FIG. 8B, the first housing 310 may move by the same or substantially the same as a distance (e.g., the width of B in the X-axis direction) from the boundary R to an adjacent line (e.g., the n+1-th line Ln+1) in the second direction.

In an embodiment, when the change in withdrawal and insertion of the TSP 365 is the same as the preset value, the processor 120 may cancel the touch recognition restriction portion B and may set a new reference line Ln+2. In this case, the preset value may be a distance from the boundary R to an adjacent plurality of lines Ln and Ln+1.

FIG. 10 is a flowchart illustrating an example method S100 of controlling the electronic device 301 according to various embodiments.

Referring to FIG. 10, the control method S100 of the electronic device 301 may include a calibration operation S170.

In an embodiment, the calibration operation S170 may be an operation of adjusting a zero point, which is basic information to set the touch recognition restriction portion B. For example, the calibration operation S170 may be an operation of the processor 120 to identify the position information of the boundary R, modify the zero point to correspond to the position information of the boundary R, and adjust information on the boundary R between the inside and outside of the housing 310 or 320 or the boundary R of the slide cover 315.

In an embodiment, the calibration operation S170 may include at least a portion of a calibration mode entry operation S171, a first touch input operation S173, an operation S175 in which a withdrawal degree of the TSP 365 changes, a second touch input operation S177, and an adjustment operation S179 of a range of the touch recognition restriction portion B.

In an embodiment, the calibration mode entry operation S171 may be a preparatory operation of the electronic device 301 to proceed with calibration or an operation of informing a user of calibration.

In an embodiment, the calibration operation S170 may be performed during a manufacturing process or an inspection process of the electronic device 301. Alternatively, the calibration operation S170 may be a part of the control method S100 of the electronic device 301 and may be initiated by the operation S171 of entering a calibration mode by a processor (e.g., the processor 120 of FIG. 1) or a user. For example, the calibration operation S170 may be performed after the operation S140 of restricting touch recognition of the touch recognition restriction portion B.

In an embodiment, the first touch input operation S173 may receive a touch by a partial area of the TSP 365 that is parallel with the plurality of lines Ln and Ln+1. For example, the first touch input operation S173 may receive a touch along the boundary R connected to the inside of the housing 310 or 320 of the electronic device 301. The processor 120 may provide a guideline corresponding to the boundary R to the user for touch input and the user may input a touch at a position corresponding to the boundary R according to the guideline. The processor 120 may calculate a position of the boundary R based on the input touch.

In an embodiment, the calibration operation S170 may perform the operation S179 of adjusting a range of the touch recognition restriction portion B without an additional touch input after the first touch input operation S173. Alternatively, the calibration operation S170 may perform the operation S179 of adjusting the range of the touch recognition restriction portion B through the operations S175 and S177 of additionally receiving a touch while changing a withdrawal degree of the TSP 365.

In an embodiment, the operation S175 in which the withdrawal degree of the TSP 365 changes may change an expanded state of the electronic device 301 and/or an insertion or withdrawal state of the TSP 365. For example, the processor 120 may move the first housing 310 by a preset distance through the slide device 278, for example, the slide device 278 may use a trigger function of motor operation. In an embodiment, a user may expand the first housing 310, and a sensor module (e.g., the sensor module 176 of FIG. 1) may recognize and transmit an expanded state of the first housing 310 to the processor 120. When the first housing 310 expands as the first housing 310 moves by the preset distance, in interoperation therewith, the degree of withdrawal and insertion of TSP 365 may change.

In an embodiment, the second touch input operation S177 may adjust the boundary R in the expanded state by the expanded state change operation S175, and may additionally receive a touch. In an embodiment, the operation S175 in which the withdrawal degree of the TSP 365 changes may change the expanded state of the electronic device 301 within a value of the interval t in which the plurality of lines Ln and Ln+1 is spaced apart from each other, and the second touch input operation S177 may more precisely adjust the touch recognition restriction portion B based on input touch information in the same boundary area M.

In an embodiment, the calibration operation S170 may perform a first visual information display operation S174 that displays visual information to the display 361 such that when a touch is input, the input touch information is indicated, based on the first touch input operation S173. In an embodiment, the calibration operation S170 may perform a second visual information display operation S178 that displays visual information to the display 361 such that when a touch is input, the input touch information is indicated, based on the second touch input operation S177.

In an embodiment, through the visual information display operations S174 and S178, the user may identify graphic information displayed on the display 361 and may identify whether there is a problem with touch recognition of an input touch, and the processor 120 may receive feedback from the user. In an embodiment, since an expansion interval of the housing 310 or 320 and a moving interval of the TSP 351 may be fine, the provide 120 may enlarge and provide an input touch graphic, and the user may easily distinguish a touch recognition range and precisely calibrate.

In an embodiment, the touch recognition restriction portion B adjustment operation S177 may identify position information of the boundary R based on a touch input to the boundary R and may adjust the touch recognition restriction portion B by modifying the zero point to correspond to the position information of the boundary R. For example, the touch recognition restriction portion B adjustment operation S177 may adjust a position of the boundary R recognized by the processor 120 based on touch recognition results of the first touch input operation S173 and the second touch input operation S177 and a change of the operation S175 in which the withdrawal degree of the TSP 365 changes, and based thereon, may adjust the touch recognition restriction portion B while modifying the zero point.

Figure 11A:
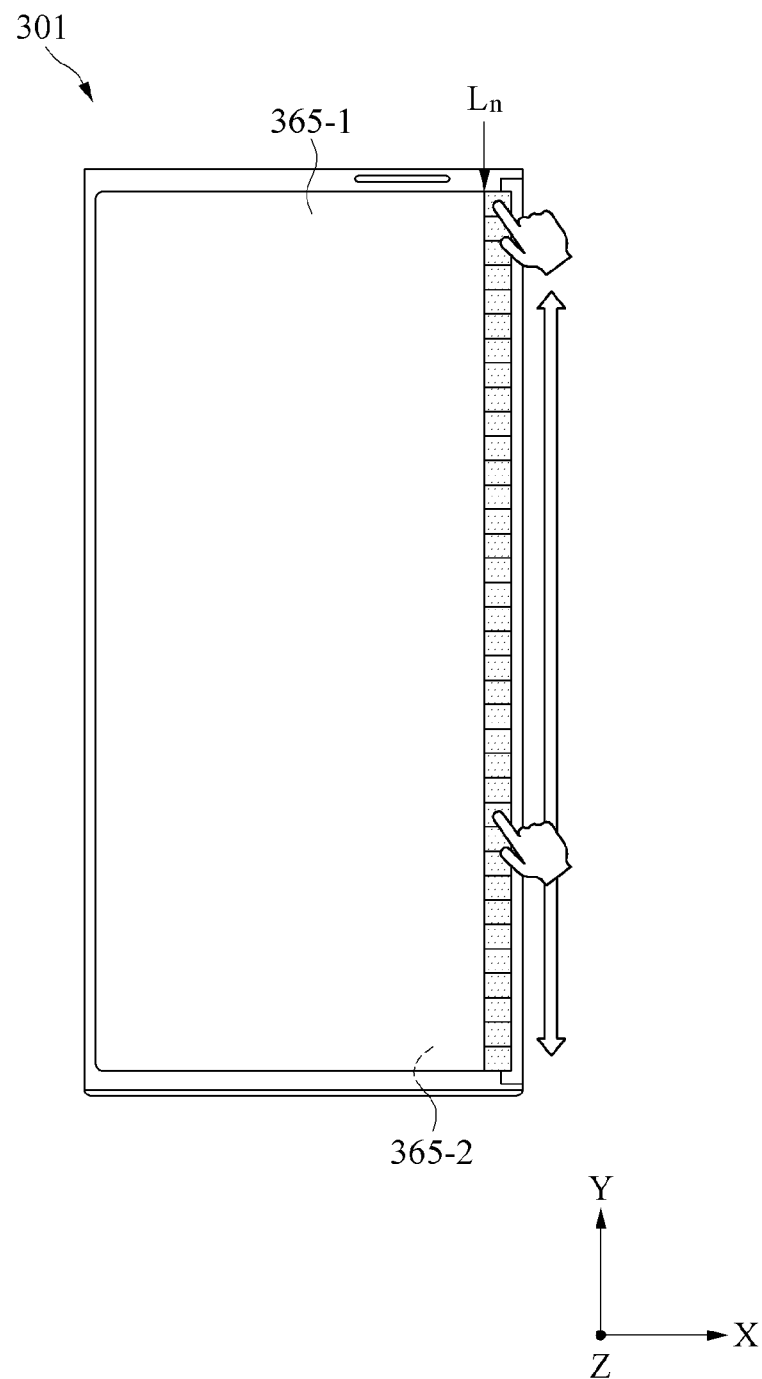
FIG. 11A is a diagram illustrating an example method of controlling an electronic device according to various embodiments.
Figure 11B:
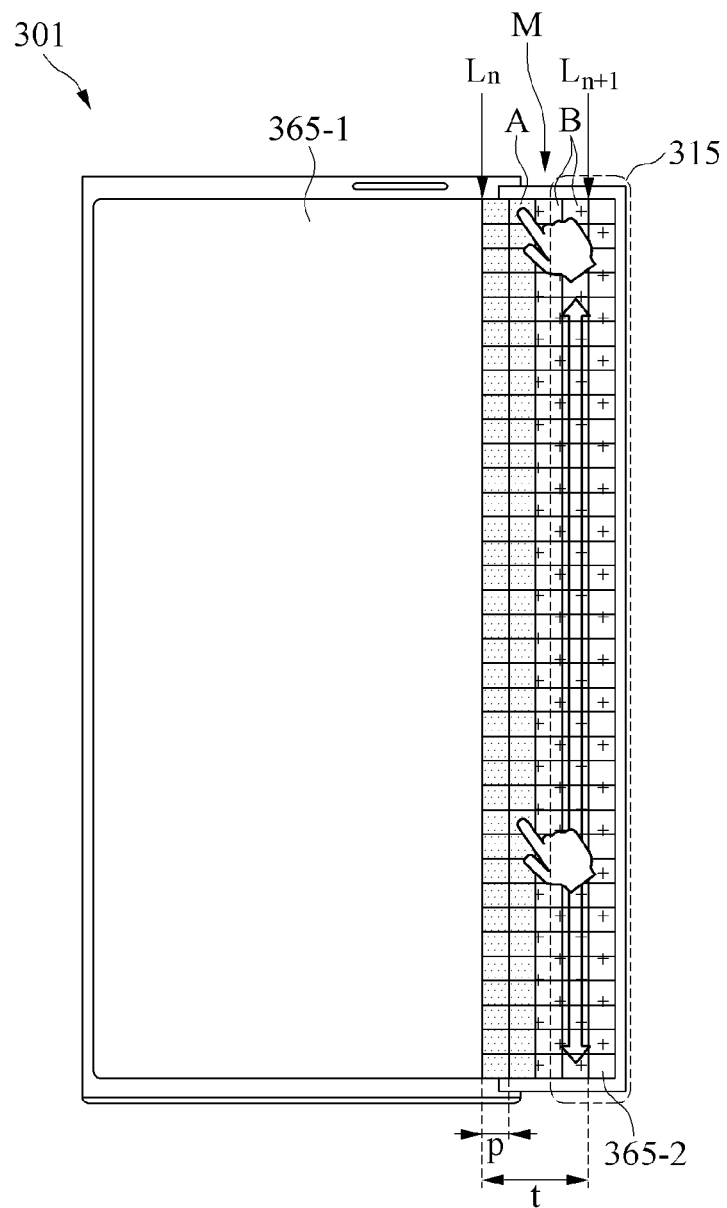
FIG. 11B is a diagram illustrating an example method of controlling the electronic device according to various embodiments.
Figure 11C:
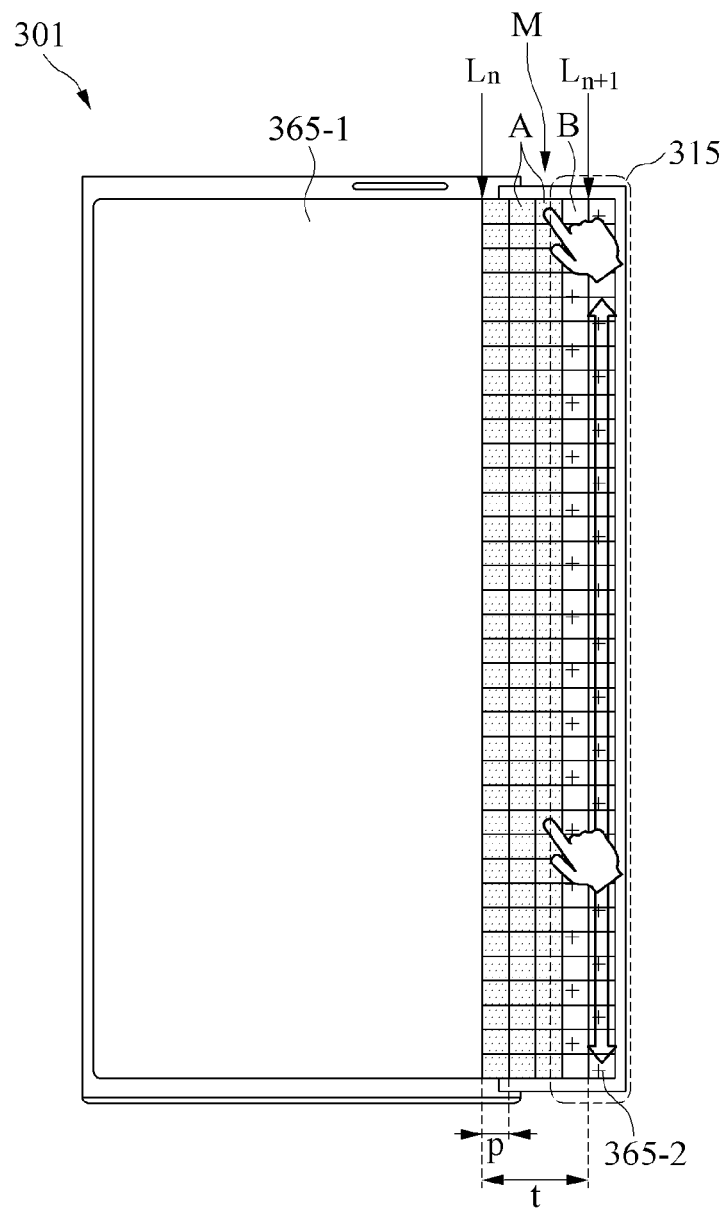
FIG. 11C is a diagram illustrating an example method of controlling the electronic device according to various embodiments.

FIG. 11A is a diagram illustrating an example method S100 of controlling the electronic device 301 according to various embodiments, FIG. 11B is a diagram illustrating an example method S100 of controlling the electronic device 301 according to various embodiments, and FIG. 11C is a diagram illustrating an example method S100 of controlling the electronic device 301 according to various embodiments.

FIGS. 11A, 11B and 11C (which may be referred to as FIGS. 11A to 11C) are diagrams illustrating the calibration operation S170 (refer to FIG. 10) of the control method S100 (refer to FIGS. 4 and 5) of the electronic device 301 and any repeated description related to the descriptions provided above may not be provided here.

Referring to FIG. 11A, in an embodiment, a user may input a touch in a vertical direction (e.g., the +Y direction) to an end in one direction (e.g., the +X direction) of the TSP 365. In an embodiment, the processor 120 may receive a touch input of the TSP 365, and based thereon, may adjust a position of the boundary R (refer to FIG. 3A) recognized by the processor 120 by performing the calibration operation S170, wherein the boundary R may be basic information to set the touch recognition restriction portion B.

For example, the TSP 365 may supply power to the first area 365-1 based on information on the reference line boundary R and may restrict power supply to the second area 365-2. Alternatively, the processor 120 may enable touch recognition in the first area 365-1 and may disable touch recognition in the second area 365-2.

Referring to FIGS. 11B and 11C, in an embodiment, in the electronic device 301, the housing 310 or 320 may expand and the slide cover 315 may move in one direction (e.g., the X direction). A distance that the slide cover 315 moves may be less than an interval t in which the plurality of lines Ln and Ln+1 is spaced apart from each other and may be greater than a minimum slide interval p. In this case, the electronic device 301 may adjust the touch recognition restriction portion B and the other area A by receiving a calibration input while maintaining an expansion range.

In an embodiment, in the electronic device 301, the touch recognition restriction portion B may be differently required depending on a use environment of a user. For example, as shown in FIG. 11B, the user may input a calibration touch at a position that is quite spaced apart from the slide cover 315 in the boundary area M. In an embodiment, as shown in FIG. 11C, the user may input a calibration touch at a position that is closely in contact with the slide cover 315 in the boundary area M. The processor 120 in an embodiment of the present disclosure may set a position of the boundary R recognized by the processor 120 based on the input touch area and may adjust the touch recognition restriction portion B and a screen display area of the display 361.

In an embodiment, the processor 120 may customize the touch recognition restriction portion B by considering the use environment of a user. For example, the size of a user's finger that inputs a touch to the TSP 365 may vary, or the boundary of a screen of the display 361 that the user desires may be different. The processor 120 may adjust a position of the boundary R recognized by the processor 120 by performing the calibration operation S170 and may set the touch recognition restriction portion B and the screen display area of the display 361 to suit the user.

A method of controlling an electronic device including a touch screen panel (TSP) disposed in a housing, and of which at least a portion is able to be withdrawn from the housing, may include: identifying a withdrawal degree of the TSP, based on the withdrawal degree, identifying a reference line that divides an area in which touch recognition is enabled and an area in which touch recognition is disabled, enabling a first area comprising a touch area in the first direction in which the TSP is withdrawn and disabling a second area comprising a touch area in the second direction opposite to the first direction, and restricting touch recognition of the touch recognition restriction portion including at least a partial area between the identified reference line and a boundary between a withdrawn area of the TSP and an area disposed inside the housing of the TSP.

In an example embodiment, the identifying a reference line may identify a closest line in the second direction from the boundary among the plurality of lines as the reference line based on an identification result of the withdrawal degree of the TSP.

The restricting the touch recognition of the touch recognition restriction portion may lower touch recognition sensitivity of the touch recognition restriction portion or even when a touch is sensed, may ignore or reject the touch in the touch recognition restriction portion.

In an example embodiment, disabling the second area may restrict power supply to at least one of the plurality of lines included in the second area.

In an example embodiment, the method of controlling the electronic device may further include sensing a change in the withdrawal degree of the TSP, and in response to sensing the change in the withdrawal degree of the TSP, adjusting at least one of the reference line or the touch recognition restriction portion.

In an example embodiment, the calibration setting the touch recognition restriction portion may be further included and the calibration may include receiving a touch in a specified area including at least a portion of the boundary of the TSP and adjusting a range of the touch recognition restriction portion based on the received touch.

In an example embodiment, the calibration may include changing the withdrawal degree of the TSP and the sensing the boundary again in response to the change in the withdrawal degree of the TSP and receiving a touch input in a specified area including at least a portion of the boundary that is sensed again.

In an example embodiment, the changing the withdrawal degree of the TSP may change the withdrawal degree of the TSP by a numerical value within an interval in which the plurality of lines are spaced apart from each other.

In an example embodiment, the calibration may further include displaying visual information on the TSP indicating a position where the touch input is input.

In an example embodiment, the calibration may be performed after restricting touch recognition of the touch recognition restriction portion.

A method of controlling the electronic device including the TSP disposed in the housing, and of which at least a portion is able to be withdrawn from the housing, according to an example embodiment, may include identifying a withdrawal degree of the TSP, selecting a reference line to control a power supply range of a plurality of touch areas from the plurality of lines partitioning the plurality of touch areas of the TSP based on the withdrawal degree, supplying power to a touch area (e.g., the first area 365-1) in a first direction in which the TSP is withdrawn based on the reference line and blocking power to a touch area (e.g., the second area 365-2) in a second direction opposite to the first direction based on the reference line, and restricting touch recognition with respect to a portion (e.g., the recognition restriction portion B) extending from the reference line in a touch area (e.g., the boundary area M) that is in contact with the reference line in the touch area in the first direction.

In an example embodiment, selecting a reference line may select the closest line in the second direction from the boundary R between the inside and outside of the housing from which the TSP is withdrawn from the plurality of lines.

In an example embodiment, for the portion extending from the reference line in the touch area, restricting touch recognition may lower touch recognition sensitivity or even when a touch is sensed, may ignore or reject the touch.

In an example embodiment, the method of controlling the electronic device may further include sensing a change in the withdrawal degree of the TSP, and in response to sensing the change in the withdrawal degree of the TSP, adjusting the reference line.

In an example embodiment, the method of controlling the electronic device may further include sensing a change in the withdrawal degree of the TSP, and in response to sensing the change in the withdrawal degree of the TSP, adjusting a range of the portion in which touch recognition is restricted.

In an example embodiment, the method of controlling the electronic device may further include setting the range of the portion in which touch recognition is restricted, wherein the calibration may include receiving a touch input in the touch area in contact with the reference line in the touch area in the first direction, and based on the received touch input, adjusting the range of the portion in which touch recognition is restricted.

In an example embodiment, the calibration may include the changing the withdrawal degree of the TSP, and sensing a position change of the boundary between the inside and outside of the housing from which the TSP is withdrawn and receiving a touch input in a partial area of a touch area adjacent to the sensed boundary, in response to a change in the withdrawal degree of the TSP.

In an example embodiment, the changing the withdrawal degree of the TSP may change the withdrawal degree of the TSP by a numerical value within an interval in which the plurality of lines are spaced apart from each other.

In an example embodiment, the calibration may further include displaying visual information on the TSP to indicate a position where the touch input is input.

In an example embodiment, the calibration operation S170 may be performed after the operation S140 of restricting touch recognition.

An electronic device according to an example embodiment of the present disclosure may include: a plurality of housings including a first housing and a second housing movable relative to the first housing, a touch screen panel (TSP) configured to be withdrawn from an outside of the plurality of housings as the second housing moves, a memory configured to store executable instructions, and at least one processor, comprising processing circuitry, configured to access the memory and execute the instructions, wherein at least one processor, individually and/or collectively, is configured to: supply power to a touch area in the first direction in which the TSP is withdrawn based on the reference line to control a power supply range and block power to the touch area in the second direction opposite to the first direction based on the reference line, and restrict touch recognition in a portion extending from the reference line in the touch area in contact with the reference line in the touch area −1 in a first area.

In an example embodiment, at least one processor, individually and/or collectively, may be configured to, select the reference line to be the closet line from the boundary between the inside and outside of the plurality of housings from which the TSP is withdrawn in the second direction.

In an example embodiment, at least one processor, individually and/or collectively, may be configured to, lower touch recognition sensitivity or even when a touch is sensed, ignore or reject the touch for the portion extending from the reference line in the touch area.

In an example embodiment, at least one processor, individually and/or collectively, may be configured to, in response to a change in the withdrawal degree of the TSP being sensed, adjust a range of the portion in which touch recognition is restricted.

In an example embodiment, at least one processor, individually and/or collectively, may be configured to sense a position change of the boundary between the inside and outside of the plurality of housings from which the TSP is withdrawn and receive a touch input in a partial area of a touch area adjacent to a sensed boundary.

In an example embodiment, the electronic device may include: a first housing and a second housing, wherein the first housing is relatively movable with respect to the second housing, a plurality of lines, a touch screen panel (TSP) disposed in the plurality of the housings wherein at least a portion of the TSP is withdrawn from the outside of the plurality of housings as the first housing moves, a memory configured to store executable instructions, and at least one processor, comprising processing circuitry, connected to the TSP and the memory.

In an example embodiment, at least one processor, individually and/or collectively, may be configured to identify a withdrawal degree of the TSP, and based on the identified withdrawal degree, identify a reference line dividing an area in which touch recognition is enabled and an area in which touch recognition is disabled, enable a first area including a touch area in a first direction in which the TSP is withdrawn and disable a second area including a touch area in a second direction opposite to the first direction based on the identified reference line, and restrict touch recognition of the touch recognition restriction portion including at least a partial area between the identified reference line and the boundary between a withdrawn area of the TSP and an area disposed inside the plurality of housings.

In an example embodiment, the identified reference line may be the closest line in the second direction from the boundary among the plurality of lines based on an identification result of the withdrawal degree of the TSP.

In an example embodiment, at least one processor, individually and/or collectively, may be configured to lower touch recognition sensitivity or restrict touch recognition of the touch recognition restriction portion to ignore or reject a touch even when the touch is sensed.

In an example embodiment, at least one processor, individually and/or collectively, may be configured to disable the second area and restrict power supply to at least one of the plurality of included in the second area.

In an example embodiment, at least one processor, individually and/or collectively, may be configured to receive a touch input in a specified area including at least a portion of the boundary of the TSP to adjust basic information for setting the touch recognition restriction portion and adjust the touch recognition restriction portion based on the received touch input.

In an example embodiment, an electronic device may include a slide device including a rail configured to move the first housing relative to the second housing, wherein at least one processor, individually and/or collectively, may be configured to change the withdrawal degree of a touch screen panel (TSP) through the slide device, sense a boundary again in response to a change in the withdrawal degree, receive touch inputs at least twice in a specified area including at least a portion of the boundary sensed again, and adjust the touch recognition restriction portion based thereon.

In an example embodiment, at least one processor, individually and/or collectively, may be configured to change the withdrawal degree of the TSP by a numerical value within an interval in which the plurality of lines is spaced apart from each other through the slide device.

In an example embodiment, the electronic device may be configured to display visual information on the TSP indicating a position where the touch input is input.

Although various example embodiments are illustrated and described above, the disclosure is not limited to specific embodiments described above. It will be apparent to those skilled in the art that various modifications may be implemented without departing from the scope of the disclosure, including the appended claims, and their equivalents. It will also be understood that any of the embodiment(s) described herein may be used in conjunction with any other embodiment(s) described herein.

What is claimed is:

1. A method of controlling an electronic device comprising a touch screen panel (TSP) disposed at least partially in a housing, and at least a portion of which is able to be withdrawn from the housing in an extension direction, the method comprising:
   identifying a withdrawal degree of the TSP;
   based on the withdrawal degree, selecting a reference line from a plurality of lines that partition a plurality of touch areas of the TSP,
     wherein the reference line is a closest line in a reduction direction, opposite to the extension direction, from a boundary line, and
     wherein the boundary line separates an inside and outside of the housing from which the TSP is withdrawn;
   supplying power to a first touch area in the extension direction based on the reference line and blocking power to a second touch area in the reduction direction based on the reference line; and
   restricting touch recognition for touch input to a portion of the first touch area between the boundary line and the reference line.

2. The method of claim 1, wherein the restricting the touch recognition comprises:
   for the portion extending from the reference line in the touch area, lowering touch recognition sensitivity or based a touch being sensed, ignoring or rejecting the touch.

3. The method of claim 1, further comprising:
   sensing a change in the withdrawal degree of the TSP; and
   in response to sensing the change in the withdrawal degree of the TSP, adjusting the reference line.

4. The method of claim 1, further comprising:
sensing a change in the withdrawal degree of the TSP; and
in response to sensing the change in the withdrawal degree of the TSP, adjusting a range of the portion in which touch recognition is restricted.

5. The method of claim 1, further comprising:
setting a range of the portion in which touch recognition is restricted as part of a calibration,
wherein the calibration comprises:
receiving a touch input in a touch area in contact with the reference line in the touch area; and
based on the received touch input, adjusting the range of the portion in which touch recognition is restricted.

6. The method of claim 5, wherein the calibration comprises:
changing the withdrawal degree of the TSP; and
sensing a position change of a boundary between an inside and an outside of the housing from which the TSP is withdrawn and receiving a touch input in a partial area of a touch area adjacent to a sensed boundary, in response to a change in the withdrawal degree of the TSP.

7. The method of claim 6, wherein changing the withdrawal degree of the TSP changes the withdrawal degree of the TSP by a numerical value within an interval in which the plurality of lines are spaced apart from each other.

8. The method of claim 5, wherein the calibration further comprises:
displaying visual information on the TSP indicating a position where the touch input is input.

9. The method of claim 5, wherein the calibration is performed after the restricting touch recognition.

10. An electronic device comprising:
a first housing, and a second housing configured to be movable relative to the first housing;
a touch screen panel (TSP) configured to be withdrawn from an outside of the plurality of housings as the second housing moves;
a memory configured to store executable instructions; and
at least one processor, comprising processing circuitry, configured to access the memory and execute the instructions,
wherein at least one processor, individually and/or collectively, is configured to:
select a reference line from among a plurality of lines that partition a plurality of touch areas of the TSP,
wherein the reference line is a closest line in a reduction direction, opposite to the extension direction, from a boundary line, and
wherein the boundary line separates an inside and an outside of the housing from which the TSP is withdrawn;
supply power to a first touch area in the extension direction based on the reference line and blocking power to a second touch area in the reduction direction based on the reference line, among the plurality of touch areas; and
restrict touch recognition for touch input to a portion of the first touch area between the boundary line and the reference line.

11. The electronic device of claim 10, wherein at least one processor, individually and/or collectively, is configured to:
for the portion extending from the reference line in the touch area, lower touch recognition sensitivity or based on a touch being sensed, ignore or reject the touch.

12. The electronic device of claim 10, wherein at least one processor, individually and/or collectively, is configured to:
in response to a change in the withdrawal degree of the TSP being sensed, adjust a range of the portion in which touch recognition is restricted.

13. The electronic device of claim 10, wherein at least one processor, individually and/or collectively, is configured to:
sense a position change of the boundary between the inside and outside of the plurality of housings from which the TSP is withdrawn and receive a touch input in a partial area of a touch area adjacent to a sensed boundary to adjust basic information for setting the range of the portion in which touch recognition is restricted.

* * * * *